(12) United States Patent
Dervisoglu et al.

(10) Patent No.: US 12,478,835 B2
(45) Date of Patent: Nov. 25, 2025

(54) DETECTING THE END OF HIKING ACTIVITIES ON A WEARABLE DEVICE

(71) Applicant: Apple Inc., Cupertino, CA (US)

(72) Inventors: Gunes Dervisoglu, Santa Clara, CA (US); Hung A. Pham, Oakland, CA (US); Bharath Narasimha Rao, Mountain View, CA (US); James P. Ochs, San Francisco, CA (US); Erin Paeng, Portland, OR (US); Jonathan M. Beard, San Jose, CA (US); Vinay R. Majjigi, Mountain View, CA (US); Karthik Jayaraman Raghuram, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 1112 days.

(21) Appl. No.: 17/033,027

(22) Filed: Sep. 25, 2020

(65) Prior Publication Data

US 2021/0093918 A1   Apr. 1, 2021

Related U.S. Application Data

(60) Provisional application No. 62/907,542, filed on Sep. 27, 2019.

(51) Int. Cl.
*H04W 4/021* (2018.01)
*A63B 24/00* (2006.01)
(Continued)

(52) U.S. Cl.
CPC ...... *A63B 24/0062* (2013.01); *A63B 24/0021* (2013.01); *H04W 4/021* (2013.01);
(Continued)

(58) Field of Classification Search
CPC . A63B 24/0062; A63B 24/00; A63B 24/0021; A63B 2024/0031;
(Continued)

(56) References Cited

U.S. PATENT DOCUMENTS 4,566,461 A  1/1986 Lubell et al.
4,740,009 A  4/1988 Hoelzl
(Continued)

FOREIGN PATENT DOCUMENTS

AU  2008100295 A4  5/2008
CN  102481479 A    5/2012
(Continued)

OTHER PUBLICATIONS

Shen et al. "MiLift: Efficient Smartwatch-Based Workout Tracking Using Automatic Segmentation". Jul. 2018, IEEE, vol. 17, No. 7, pp. 1609-1622. (Year: 2018).*

(Continued)

*Primary Examiner* — Mohamed Charioui
(74) *Attorney, Agent, or Firm* — Fish & Richardson P.C.

(57) ABSTRACT

Disclosed embodiments include wearable devices and techniques for detecting the end of hiking activities. By accurately and promptly detecting the end of hiking activities automatically, the disclosure enables wearable devices to accurately calculate user performance information when users forget to start and/or stop recording a hiking activity.

19 Claims, 7 Drawing Sheets

(51) Int. Cl.
*H04W 4/02* (2018.01)
*H04W 4/029* (2018.01)

(52) U.S. Cl.
CPC .......... *H04W 4/023* (2013.01); *H04W 4/029* (2018.02); *A63B 2024/0025* (2013.01); *A63B 2220/12* (2013.01); *A63B 2220/803* (2013.01)

(58) Field of Classification Search
CPC .... A63B 2024/0028; A63B 2024/0025; A63B 2024/0021; A63B 2024/00; A63B 2220/12; A63B 2220/13; A63B 2220/10; A63B 2220/00; A63B 2220/803; A63B 2220/80; H04W 4/021; H04W 4/02; H04W 4/00; H04W 4/023; H04W 4/029; G16H 40/63; G16H 20/30; G16H 40/30; H04M 1/72412
See application file for complete search history.

(56) References Cited

U.S. PATENT DOCUMENTS

| | | |
|---|---|---|
| 5,158,093 A | 10/1992 | Shvartz et al. |
| 5,376,036 A | 12/1994 | Hull |
| 5,663,897 A | 9/1997 | Geiser |
| 5,664,499 A | 9/1997 | Kingsmill |
| 6,013,008 A | 1/2000 | Fukushima |
| 6,059,724 A | 5/2000 | Campbell et al. |
| 6,582,380 B2 | 6/2003 | Kazlausky et al. |
| 6,687,535 B2 | 2/2004 | Hautala et al. |
| 6,837,827 B1 | 1/2005 | Lee et al. |
| 6,862,525 B1* | 3/2005 | Beason .................. G01C 21/20 |
| | | 701/487 |
| 6,868,338 B1 | 3/2005 | Elliott |
| 6,876,947 B1 | 4/2005 | Darley et al. |
| 7,254,516 B2 | 8/2007 | Case et al. |
| 7,311,675 B2 | 12/2007 | Peifer et al. |
| 7,377,180 B2 | 5/2008 | Cunningham |
| 7,387,029 B2 | 6/2008 | Cunningham |
| 7,467,060 B2 | 12/2008 | Kulach et al. |
| 7,534,206 B1 | 5/2009 | Lovitt et al. |
| 7,647,196 B2 | 1/2010 | Kahn et al. |
| 7,690,556 B1 | 4/2010 | Kahn et al. |
| 7,771,320 B2 | 8/2010 | Riley et al. |
| 7,805,149 B2 | 9/2010 | Werner et al. |
| 7,841,967 B1 | 11/2010 | Kahn et al. |
| 8,290,480 B2 | 10/2012 | Abramson et al. |
| 8,483,775 B2 | 7/2013 | Buck et al. |
| 8,531,180 B2 | 9/2013 | Piemonte et al. |
| 8,589,174 B2 | 11/2013 | Nelson et al. |
| 8,638,320 B2 | 1/2014 | Harley et al. |
| 8,653,956 B2 | 2/2014 | Berkobin et al. |
| 8,784,271 B2 | 7/2014 | Brumback et al. |
| 8,890,854 B2 | 11/2014 | Tenuta et al. |
| 8,892,391 B2 | 11/2014 | Tu et al. |
| 8,894,576 B2 | 11/2014 | Alwan et al. |
| 8,911,329 B2 | 12/2014 | Lin et al. |
| 8,928,635 B2 | 1/2015 | Harley et al. |
| 9,195,305 B2 | 11/2015 | Markovic et al. |
| 9,264,862 B2 | 2/2016 | Tu et al. |
| 9,413,871 B2 | 8/2016 | Nixon et al. |
| 9,448,250 B2 | 9/2016 | Pham et al. |
| 9,526,430 B2 | 12/2016 | Srinivas et al. |
| 9,704,412 B2 | 7/2017 | Wells et al. |
| 9,737,761 B1 | 8/2017 | Sivaraj |
| 9,788,794 B2 | 10/2017 | Leboeuf et al. |
| 9,817,948 B2* | 11/2017 | Swank .............. H04M 1/72421 |
| 9,918,646 B2 | 3/2018 | Alvarado et al. |
| 9,998,864 B2 | 6/2018 | Kumar et al. |
| 10,039,969 B2 | 8/2018 | Burton et al. |
| 10,098,549 B2 | 10/2018 | Tan et al. |
| 10,154,789 B2 | 12/2018 | Raghuram et al. |
| 10,188,347 B2 | 1/2019 | Self et al. |
| 10,206,627 B2 | 2/2019 | Leboeuf et al. |
| 10,219,708 B2 | 3/2019 | Altini |
| 10,244,948 B2 | 4/2019 | Pham et al. |
| 10,290,260 B2 | 5/2019 | Wu et al. |
| 10,292,606 B2 | 5/2019 | Wisbey et al. |
| 10,512,406 B2 | 12/2019 | Martinez et al. |
| 10,524,670 B2 | 1/2020 | Raghuram et al. |
| 10,617,912 B2 | 4/2020 | Narasimha Rao et al. |
| 10,620,232 B2 | 4/2020 | Tu et al. |
| 10,687,707 B2 | 6/2020 | Tan et al. |
| 10,687,752 B2 | 6/2020 | Pham et al. |
| 10,694,994 B2 | 6/2020 | Alvarado et al. |
| 10,699,594 B2 | 6/2020 | Mermel et al. |
| 10,709,933 B2 | 7/2020 | Tan et al. |
| 11,051,720 B2 | 7/2021 | Perry et al. |
| 11,103,749 B2 | 8/2021 | Mermel et al. |
| 11,278,765 B2 | 3/2022 | Mohrman et al. |
| 11,517,789 B2 | 12/2022 | Xie et al. |
| 11,896,368 B2 | 2/2024 | Narasimha Rao et al. |
| 11,937,904 B2 | 3/2024 | Ochs et al. |
| 12,109,453 B2 | 10/2024 | Dervisoglu et al. |
| 2001/0022828 A1 | 9/2001 | Pyles |
| 2002/0019585 A1 | 2/2002 | Dickinson |
| 2003/0032460 A1 | 2/2003 | Cannon et al. |
| 2003/0138763 A1 | 7/2003 | Roncalez et al. |
| 2004/0064061 A1 | 4/2004 | Nissila |
| 2005/0065443 A1 | 3/2005 | Ternes |
| 2005/0107723 A1 | 5/2005 | Wehman et al. |
| 2005/0124906 A1 | 6/2005 | Childre et al. |
| 2005/0212701 A1 | 9/2005 | Nimmo |
| 2006/0046898 A1 | 3/2006 | Harvey |
| 2006/0064277 A1 | 3/2006 | Jung et al. |
| 2006/0136173 A1 | 6/2006 | Case et al. |
| 2006/0190217 A1 | 8/2006 | Lee et al. |
| 2006/0217231 A1 | 9/2006 | Parks et al. |
| 2007/0010341 A1 | 1/2007 | Miettinen et al. |
| 2007/0100666 A1 | 5/2007 | Stivoric et al. |
| 2007/0150229 A1 | 6/2007 | Fujiwara |
| 2007/0219059 A1 | 9/2007 | Schwartz et al. |
| 2007/0275825 A1 | 11/2007 | O'Brien |
| 2007/0276271 A1 | 11/2007 | Chan |
| 2007/0293374 A1 | 12/2007 | Chan |
| 2008/0096726 A1 | 4/2008 | Riley et al. |
| 2008/0214360 A1 | 9/2008 | Stirling et al. |
| 2009/0009320 A1 | 1/2009 | O'Connor et al. |
| 2009/0024332 A1 | 1/2009 | Karlov et al. |
| 2009/0043531 A1 | 2/2009 | Kahn et al. |
| 2009/0063099 A1 | 3/2009 | Counts et al. |
| 2009/0143199 A1 | 6/2009 | Nishibayashi |
| 2009/0240461 A1 | 9/2009 | Makino et al. |
| 2009/0319221 A1 | 12/2009 | Kahn et al. |
| 2010/0030350 A1 | 2/2010 | House et al. |
| 2010/0030482 A1 | 2/2010 | Li |
| 2010/0130890 A1 | 5/2010 | Matsumura et al. |
| 2010/0184564 A1 | 7/2010 | Molyneux et al. |
| 2010/0204952 A1 | 8/2010 | Irlam et al. |
| 2010/0210953 A1 | 8/2010 | Sholder et al. |
| 2010/0210975 A1 | 8/2010 | Anthony et al. |
| 2010/0217099 A1 | 8/2010 | Leboeuf et al. |
| 2010/0274102 A1 | 10/2010 | Teixeira |
| 2010/0298656 A1 | 11/2010 | McCombie et al. |
| 2011/0040193 A1 | 2/2011 | Seppanen et al. |
| 2011/0054359 A1 | 3/2011 | Sazonov et al. |
| 2011/0082008 A1 | 4/2011 | Cheung et al. |
| 2011/0131012 A1 | 6/2011 | Czaja et al. |
| 2011/0152695 A1 | 6/2011 | Granqvist et al. |
| 2011/0195707 A1 | 8/2011 | Faerber et al. |
| 2011/0238485 A1 | 9/2011 | Haumont et al. |
| 2011/0301436 A1 | 12/2011 | Teixeira |
| 2012/0006112 A1 | 1/2012 | Lee et al. |
| 2012/0083715 A1 | 4/2012 | Yuen et al. |
| 2012/0172677 A1 | 7/2012 | Logan et al. |
| 2012/0238832 A1 | 9/2012 | Jang et al. |
| 2012/0245714 A1 | 9/2012 | Mueller et al. |
| 2012/0296455 A1 | 11/2012 | Ohnemus et al. |
| 2012/0310527 A1* | 12/2012 | Yariv .................... H04W 4/021 |
| | | 701/426 |
| 2012/0322621 A1 | 12/2012 | Bingham et al. |
| 2013/0006515 A1* | 1/2013 | Vellaikal ............... H04W 4/021 |
| | | 701/410 |

(56) References Cited

U.S. PATENT DOCUMENTS

| | | |
|---|---|---|
| 2013/0006522 A1* | 1/2013 | Vellaikal ............... H04W 4/021 701/426 |
| 2013/0023739 A1 | 1/2013 | Russell |
| 2013/0041590 A1 | 2/2013 | Burich et al. |
| 2013/0053990 A1 | 2/2013 | Ackland |
| 2013/0073255 A1 | 3/2013 | Yuen et al. |
| 2013/0085861 A1 | 4/2013 | Dunlap |
| 2013/0096943 A1 | 4/2013 | Carey et al. |
| 2013/0135097 A1 | 5/2013 | Doezema |
| 2013/0158686 A1 | 6/2013 | Zhang et al. |
| 2013/0178335 A1 | 7/2013 | Lin et al. |
| 2013/0197377 A1 | 8/2013 | Kishi et al. |
| 2013/0218053 A1 | 8/2013 | Kaiser et al. |
| 2013/0267794 A1 | 10/2013 | Fernstrom et al. |
| 2013/0326137 A1* | 12/2013 | Bilange ............... H04L 67/5682 711/113 |
| 2013/0340287 A1 | 12/2013 | Stewart |
| 2014/0071082 A1 | 3/2014 | Singh et al. |
| 2014/0073486 A1 | 3/2014 | Ahmed et al. |
| 2014/0087708 A1 | 3/2014 | Kalita et al. |
| 2014/0088444 A1 | 3/2014 | Saalasti et al. |
| 2014/0107932 A1 | 4/2014 | Luna |
| 2014/0109390 A1 | 4/2014 | Manning |
| 2014/0121471 A1 | 5/2014 | Walker |
| 2014/0167973 A1 | 6/2014 | Letchner et al. |
| 2014/0172238 A1 | 6/2014 | Craine |
| 2014/0172361 A1 | 6/2014 | Chiang et al. |
| 2014/0197946 A1 | 7/2014 | Park et al. |
| 2014/0200906 A1 | 7/2014 | Bentley et al. |
| 2014/0207264 A1 | 7/2014 | Quy |
| 2014/0213920 A1 | 7/2014 | Lee et al. |
| 2014/0221854 A1 | 8/2014 | Wai |
| 2014/0228649 A1 | 8/2014 | Rayner et al. |
| 2014/0244071 A1 | 8/2014 | Czaja et al. |
| 2014/0266160 A1 | 9/2014 | Coza |
| 2014/0266789 A1 | 9/2014 | Matus |
| 2014/0276127 A1 | 9/2014 | Ferdosi et al. |
| 2014/0277628 A1 | 9/2014 | Nieminen |
| 2014/0278139 A1 | 9/2014 | Hong et al. |
| 2014/0278229 A1 | 9/2014 | Hong et al. |
| 2014/0279123 A1* | 9/2014 | Harkey ............... G06Q 30/0619 705/26.1 |
| 2014/0316305 A1 | 10/2014 | Venkatraman et al. |
| 2014/0348367 A1 | 11/2014 | Vavrus et al. |
| 2015/0066526 A1 | 3/2015 | Cheng et al. |
| 2015/0072712 A1* | 3/2015 | Huang ............... H04W 4/029 455/456.3 |
| 2015/0087929 A1 | 3/2015 | Rapoport et al. |
| 2015/0088006 A1 | 3/2015 | Rapoport et al. |
| 2015/0100141 A1 | 4/2015 | Hughes |
| 2015/0105096 A1 | 4/2015 | Chowdhury et al. |
| 2015/0119728 A1 | 4/2015 | Blackadar et al. |
| 2015/0147734 A1 | 5/2015 | Flores et al. |
| 2015/0148632 A1 | 5/2015 | Benaron |
| 2015/0173631 A1 | 6/2015 | Richards et al. |
| 2015/0182149 A1 | 7/2015 | Rapoport et al. |
| 2015/0250417 A1 | 9/2015 | Cheng et al. |
| 2015/0256689 A1 | 9/2015 | Erkkila et al. |
| 2015/0260514 A1 | 9/2015 | Menelas et al. |
| 2015/0294440 A1 | 10/2015 | Roberts |
| 2015/0327804 A1 | 11/2015 | Lefever et al. |
| 2015/0328523 A1 | 11/2015 | Heling et al. |
| 2015/0338926 A1 | 11/2015 | Park et al. |
| 2015/0345985 A1 | 12/2015 | Fung et al. |
| 2015/0357948 A1 | 12/2015 | Goldstein |
| 2015/0374240 A1 | 12/2015 | Lee |
| 2016/0021238 A1 | 1/2016 | Abramson et al. |
| 2016/0038083 A1 | 2/2016 | Ding et al. |
| 2016/0054449 A1 | 2/2016 | Pekonen et al. |
| 2016/0057372 A1 | 2/2016 | Iwane et al. |
| 2016/0058302 A1 | 3/2016 | Raghuram et al. |
| 2016/0058329 A1 | 3/2016 | Srinivas et al. |
| 2016/0058332 A1 | 3/2016 | Tan et al. |
| 2016/0058333 A1 | 3/2016 | Arnold et al. |
| 2016/0058356 A1 | 3/2016 | Raghuram et al. |
| 2016/0058370 A1 | 3/2016 | Raghuram et al. |
| 2016/0058371 A1 | 3/2016 | Singh et al. |
| 2016/0058372 A1 | 3/2016 | Raghuram et al. |
| 2016/0059079 A1 | 3/2016 | Watterson |
| 2016/0066859 A1 | 3/2016 | Crawford et al. |
| 2016/0069679 A1* | 3/2016 | Jackson ............... G01C 5/00 702/160 |
| 2016/0084869 A1 | 3/2016 | Yuen et al. |
| 2016/0143579 A1 | 5/2016 | Martikka |
| 2016/0147319 A1 | 5/2016 | Agarwal et al. |
| 2016/0166178 A1 | 6/2016 | Fuss et al. |
| 2016/0170998 A1 | 6/2016 | Frank et al. |
| 2016/0206248 A1 | 7/2016 | Sartor et al. |
| 2016/0223578 A1 | 8/2016 | Klosinski, Jr. et al. |
| 2016/0242646 A1 | 8/2016 | Obma |
| 2016/0256058 A1 | 9/2016 | Pham et al. |
| 2016/0263435 A1 | 9/2016 | Venkatraman et al. |
| 2016/0269572 A1 | 9/2016 | Erkkila et al. |
| 2016/0269868 A1 | 9/2016 | Su et al. |
| 2016/0287177 A1 | 10/2016 | Huppert et al. |
| 2016/0301581 A1 | 10/2016 | Carter et al. |
| 2016/0314633 A1 | 10/2016 | Bonanni et al. |
| 2016/0361020 A1 | 12/2016 | Leboeuf et al. |
| 2016/0363449 A1 | 12/2016 | Metzler et al. |
| 2016/0374614 A1 | 12/2016 | Cavallaro et al. |
| 2017/0007166 A1 | 1/2017 | Roovers et al. |
| 2017/0061817 A1 | 3/2017 | Mettler May |
| 2017/0074897 A1 | 3/2017 | Mermel et al. |
| 2017/0082649 A1 | 3/2017 | Tu et al. |
| 2017/0094450 A1 | 3/2017 | Tu et al. |
| 2017/0095181 A1 | 4/2017 | Hauenstein et al. |
| 2017/0111768 A1 | 4/2017 | Smith et al. |
| 2017/0181644 A1 | 6/2017 | Meer et al. |
| 2017/0182360 A1 | 6/2017 | Chang et al. |
| 2017/0188893 A1 | 7/2017 | Venkatraman et al. |
| 2017/0202486 A1 | 7/2017 | Martikka et al. |
| 2017/0211936 A1 | 7/2017 | Howell et al. |
| 2017/0242499 A1 | 8/2017 | Shah et al. |
| 2017/0242500 A1 | 8/2017 | Shah et al. |
| 2017/0251972 A1 | 9/2017 | Jayaraman et al. |
| 2017/0259116 A1 | 9/2017 | Mestas |
| 2017/0269734 A1 | 9/2017 | Graff |
| 2017/0269785 A1 | 9/2017 | Abdollahian et al. |
| 2017/0273619 A1 | 9/2017 | Alvarado et al. |
| 2017/0347885 A1 | 12/2017 | Tan et al. |
| 2017/0357007 A1 | 12/2017 | Miller et al. |
| 2017/0367658 A1 | 12/2017 | Leboeuf et al. |
| 2017/0368413 A1 | 12/2017 | Shavit |
| 2018/0028863 A1 | 2/2018 | Matsuda |
| 2018/0043210 A1 | 2/2018 | Niehaus et al. |
| 2018/0049694 A1 | 2/2018 | Singh Alvarado et al. |
| 2018/0050235 A1 | 2/2018 | Tan et al. |
| 2018/0055375 A1 | 3/2018 | Martinez et al. |
| 2018/0055439 A1 | 3/2018 | Pham et al. |
| 2018/0056123 A1 | 3/2018 | Narasimha Rao et al. |
| 2018/0056128 A1 | 3/2018 | Narasimha Rao et al. |
| 2018/0056129 A1 | 3/2018 | Narasimha Rao et al. |
| 2018/0249908 A1 | 9/2018 | Anthony et al. |
| 2018/0279914 A1 | 10/2018 | Patek et al. |
| 2018/0303381 A1 | 10/2018 | Todd et al. |
| 2018/0344217 A1 | 12/2018 | Perry et al. |
| 2019/0038938 A1 | 2/2019 | Nagasaka et al. |
| 2019/0076063 A1 | 3/2019 | Kent et al. |
| 2019/0090087 A1 | 3/2019 | Taylor et al. |
| 2019/0184230 A1 | 6/2019 | Lee et al. |
| 2019/0184233 A1 | 6/2019 | Xie et al. |
| 2019/0360813 A1 | 11/2019 | Zhao et al. |
| 2020/0232796 A1 | 7/2020 | Lee et al. |
| 2021/0068689 A1 | 3/2021 | Ochs et al. |
| 2021/0068712 A1 | 3/2021 | Humblet et al. |
| 2021/0068713 A1 | 3/2021 | Dervisoglu et al. |
| 2021/0093917 A1 | 4/2021 | Dervisoglu et al. |
| 2022/0114873 A1* | 4/2022 | Williams ............ G08B 21/0269 |

(56) References Cited

U.S. PATENT DOCUMENTS

| | | | |
|---|---|---|---|
| 2022/0241641 | A1 | 8/2022 | Mermel et al. |
| 2024/0180445 | A1 | 6/2024 | Narasimha Rao et al. |

FOREIGN PATENT DOCUMENTS

| | | | |
|---|---|---|---|
| CN | 104218976 | A | 12/2014 |
| CN | 105031905 | A | 11/2015 |
| CN | 105068656 | A | 11/2015 |
| GB | 2465824 | A | 6/2010 |
| IN | 259/KOL/2015 | | 12/2015 |
| JP | 2004089317 | | 3/2004 |
| JP | 2010-051333 | A | 3/2010 |
| JP | 2013-039316 | A | 2/2013 |
| JP | 2014-042757 | A | 3/2014 |
| JP | 2016-150018 | A | 8/2016 |
| JP | 2018-000543 | A | 1/2018 |
| JP | 2018-015187 | A | 2/2018 |
| JP | 2019028796 | | 2/2019 |
| JP | 2020148558 | | 9/2020 |
| RO | 122807 | B1 | 2/2010 |
| WO | 03/61779 | A1 | 7/2003 |
| WO | 2010/090867 | A2 | 8/2010 |
| WO | 2011/105914 | A1 | 9/2011 |
| WO | 2015/126182 | A1 | 8/2015 |
| WO | 2015/200900 | A1 | 12/2015 |
| WO | 2016/044831 | A1 | 3/2016 |
| WO | 2016/073620 | A1 | 5/2016 |
| WO | WO 2016142246 | | 9/2016 |
| WO | WO 2018117914 | | 6/2018 |

OTHER PUBLICATIONS

U.S. Appl. No. 17/015,912, filed Sep. 9, 2020, Humblet et al.
U.S. Appl. No. 17/015,965, filed Sep. 9, 2020, Dervisoglu et al.
U.S. Appl. No. 17/016,020, filed Sep. 9, 2020, Ochs et al.
Alexander, "Energetics and Optimization of Human Walking and Running," Am J Human Biology, Mar. 20, 2002, 14:641-648.
Lasecki, "Real-Time Crowd Labeling for Deployable Activity Recognition," University of Rochester Computer Science, Feb. 23, 2013, 10 pages.
Latt et al., "Walking speed, cadence and step length are selected to optimize the stability of head and pelvis accelerations," Experimental Brain Research, Aug. 24, 2007, 184: 201-209.
Morgan et al., "Effect of step length optimization on the aerobic demand of running," Journal of Applied Physiology, 1994, 245-251.
PCT International Preliminary Report on Patentability in International Appln. No. PCT/US2017/049693, dated Mar. 5, 2019, 8 pages.
PCT International Preliminary Report on Patentability in International Appln. No. PCT/US2018/047290, dated Mar. 17, 2020, 9 pages.
Pfitzinger.com "Optimal Marathon Training Sessions, Distance Coach. com, Intelligent Training for Distance Runners, " archived May 15, 2012, <https://web.archive.org/web/20120515081237/http://www. pfitzinger .com/marathontraining.shtml>, printed Jan. 20, 2017, 3 pages.
Romijn et al., "Regulation of endogenous fat and carbohydrate metabolism in relation to exercise intensity and duration, " Am. J. Physiol., 1993, 6:1-13.
Triendurance.com "Running with a Higher Cadence, Triendurance," Oct. 23, 2021, retrieved from <https ://web. archive.org/web/ 20080228162904/http ://www.trienduranee .com/Related. asp?PageID=14&NavID=7>, 2 pages.
Zhao, "New Developments of the Typical MEMS and Wearable Sensor Technologies," Micronanoelectronic Technology, Jan. 2015, 52(1):1-13 (with English abstract).
Zhou et al., "Development of the Technical Monitoring System for Swimming Competition," China Sport Science and Technology, Aug. 2008, 44(4):84-86 (with English abstract).

"Your Fitness FAQ, Why is it important to warm up and cool down in a workout?", 2012, Web, Retrieved from: http://www.yourfitnessfaq. com/whyisitimportanttowarmupandcooldowninaworkout.html.
Bo et al., "TEXIVE: Detecting Drivers Using Personal Smart Phones by Leveraging Inertial Sensors, " Department of ComputerScience, Illinois Institute of Technology, Chicago IL, Dec. 7, 2014, pp. 1-12.
Brooks, G.A. et al., "Exercise Physiology: Human Bioenergetics and Its Applications," Fourth Edition, McGraw Hill, ISBN 0-07-255642-0, Chapter 2: Bioenergetics, Chapter 10: Metabolic Response to Exercise: Lactate Metabolism During Exercise and Recovery, Excess Postexercise 02 Consumption (EPOC), 02 Deficit, 02 Debt, and the Anaerobic Threshold, Chapter 16: Cardiovascular Dynamics During Exercise, Chapter 21: Principles of Endurance Conditioning, Chapter 27: Exercise Testing and Prescription, 141 pages (2004).
Bruce, Ra et al., "Exercising testing in adult normal subjects and cardiac patients," Pediatrics, vol. 32, No. Suppl., pp. 742-756 (Oct. 1963).
Bruce, Ra et al., "Maximal oxygen intake and nomographic assessment of functional aerobic impairment in cardiovascular disease," American Heart Journal, vol. 85, Issue 4, pp. 546-562 (Apr. 1973).
Burke, Edmund R., "High-Tech Cycling," Second Edition, Human Kinetics, Chapter 4: Optimizing the Crank Cycle and Pedaling Cadence, Chapter 5: Cycling Biomechanics, Chapter 6: Cycling Power, Chapter 10: Physiology of Professional Road Cycling, Chapter 11: Physiology of Mountain Biking, 131 pages (2003).
Cavanagh, P.R. et al., "The effect of stride length variation on oxygen uptake during distance running," Medicine and Science in Sports and Exercise, vol. 14, No. 1, pp. 30-35 (1982).
Chu, "In-Vehicle Driver Detection Using Mobile Phone Sensors", Submitted for Graduation with departmental Distinction in Electrical and Computer Engineering, Apr. 20, 2011, pp. 1-21.
Earnest, C.P. et al., "Cross-sectional association between maximal estimated cardiorespiratory fitness, cardiometabolic risk factors and metabolic syndrome for men and women in the Aerobics Center Longitudinal Study," Mayo Clin Proceedings, vol. 88, No. 3, pp. 259-270, 20 pages (Mar. 2013).
Fox, S.M. et al., "Physical Activity and the Prevention of Coronary Heart Disease," Bull. N.Y. Acad. Med., vol. 44, No. 8, pp. 950-967 (Aug. 1968).
Frankenfield et al., "Comparison of Predictive Equations for Resting Metabolic Rate in Healthy Nonobese and Obese adulls: A systematic review. Journal of the American Dietetic Association", May 2005, vol. 105, No. 5, p. 775-789.
Gao et al., "Evaluation of accelerometer based multi-sensor versus single-sensor activity recognition systems", Medical engineering & physics 36.6 (2014): 779-785.
Glass et al., "ACSM's Metabolic Calculations Handbook," Lippincott Williams & Wilkins, 124 pages (2007).
Hasson et al., "Accuracy of four resting metabolic rate production equations: Effects of sex, body mass index, age, and race/ethnicity", Journal of Science and Medicine in Sport, 2011, vol. 14, p. 344-351.
Human Kinetics, Aerobic Workout Components, 2011, Web, Retrieved from: http://www.humankinetics.com/excerpts/excerpts/aerobicworkoutcomponentsexcerpt.
International Search Report and Written Opinion received for POT Patent Application No. PCT/US2018/047290, mailed on Nov. 8, 2018, 14 pages.
Isaacs et al., "Modeling energy expenditure and oxygen consumption in human exposure models: accounting for fatigue and EPOC", 2008, Journal of Exposure Science and Environmental Epidemiology, 18: 289-298.
Jackson et al., "Prediction of functional aerobic capacity without exercise testing, Medicine and Science in Sports and Exercise", 22(6), 863-870, 1990.
Keytel et al., "Prediction of energy expenditure from heart rate monitoring during submaximal exercise", Journal of Sports Sciences, 23(3), 2005: 289-297.
KINprof, 2011, Predictive VO2max tests, Web Video, Retrieved from: https://www.youtube.com/walch?v=_9e3HcYIsm8.

(56) References Cited

OTHER PUBLICATIONS

Kunze et al. "Where am i: Recognizing on-body positions of wearable sensors." Location-and context-awareness. Springer Berlin Heidelberg, 2005. 264-275.

Kyle, Chester R., "Reduction of Wind Resistance and Power Output of Racing Cyclists and Runners Travelling in Groups", Ergonomics, vol. 22, No. 4, 1979, pp. 387-397.

Lavie et al., "Impact of cardiorespiratory fitness on the obesity paradox in patients with heartfailure," Mayo Clinic Proceedings, vol. 88, No. 3, pp. 251-258 (Mar. 2013).

Le, et al., "Sensor-based Training Optimization of a Cyclist Group", Seventh International Conference on Hybrid Intelligent Systems, IEEE 2007, pp. 265-270.

Lucas et al., "Mechanisms of orthostatic intolerance following very prolonged exercise", 2008, J. Appl. Physiol., 105: pp. 213-225.

Margaria, R. et al., "Energy cost of running," Journal of Applied Physiology, vol. 18, No. 2, pp. 367-370 (Mar. 1, 1963).

McArdle, W.D. et al., "Exercise Physiology: Nutrition, Energy and Human Performance," Seventh t:amon, Lippincott Williams & Wilkins, Chapter 5: Introduction to Energy Transfer, Chapter 6: Energy Transfer in the Body, Chapter 7: Energy Transfer During Exercise, Chapter 8: Measurement of Human Energy Expenditure, Chapter 9: Human Energy Expenditure During Rest and Physical Activity, Chapter 10: Energy Expenditure During Walking, Jogging, Running and Swimming, Chapter 11: Individual Differences and Measurement of Energy Capacities, Chapter 21: Training for Anoerobic and Aerobic Power (2010).

Myers et al., "Exercise Capacity and Mortality Among Men Referred for Exercise Testing," The New England Journal of Medicine, vol. 346, No. 11, pp. 793-801 (Mar. 14, 2002).

Noakes, Timothy D., "Lore of Running," Fourth Edition, Human Kinetics, Chapter 2: Oxygen Transport and Running Economy, Chapter 3: Energy Systems and Running Performance, 157 pages (2002).

Novatel, "IMU Error and Their Effects", Novatel Application Notes APN-064 Rev A p. 1-6, Feb. 21, 2014.

PCT International Application No. PCT/US2017/049693, International Search Report and Written Opinion dated Aug. 12, 2017.

Rapoport, Benjamin I., "Metabolic Factors Limiting Performance in Marathon Runners," PloS Computational Biology, vol. 6, Issue 10, 13 pages (Oct. 2010).

Rowlands et al. "Assessing Sedentary Behavior with the GENEActiv: Introducing the Sedentary Sphere", Medicine and science in sports and exercise, 46.6 (2014), pp. 1235-1247.

Sabatini, "Kalman-filter-based orientation determination using inertial/magnetic sensors: observability analysis and performance evaluation", Sep. 27, 2011, Sensors 2011, 11, 9182-9206.

Song et al., "Training Activity Recognition Systems Online Using Real-Time Crowdsourcing", University of Rochester Computer Science, UbiCom' 12, Sep. 5-8, 2012 (2 pages).

Tanaka, H. et al., "Age-predicted maximal heart rate revisited," Journal of the American College of Cardiology, vol. 37, Issue 1, pp. 153-156 (Jan. 2001).

Vella et al., Exercise After-Burn: Research Update, 2005, Web, Retrieved from: http://www.unm.edu/~lkravilz/Article%20folder/epocarticle.html.

Wang et al., "Time constant of heart rate recovery after low level exercise as a useful measure of cardiovascular fitness," Cont. Proc. IEEE Eng. Meda Biol. Soc., vol. 1, pp. 1799-1802: (2006).

Yamaji, et al.(Relationship Between Heart Rate and Relative Oxygen Intake in Male Subjects Aged 10 to 27 Years, 1978, J. Human Ergol., 7:29-39) (Year: 1978).

Mattfeld et al., "A New Dataset for Evaluating Pedometer Performance," IEEE International Conference on Bioinformatics and Biomedicine (BIBM), Nov. 2017, pp. 865-869.

Unuma et al., JP2007093433, published on Apr. 12, 2007, 27 pages (machine translated English version).

Kodama et al., Examination of Inertial Sensor-Based Estimation Methods of Lower Limb Joint Moments and Ground Reaction Force: Results for Squat and Sit-to-Stand Movements in the Sagittal Plane, Aug. 1, 2016, Sensors 2016, pp. 1-19 (Year: 2016).

Bächlin et al. "Pervasive computing in swimming: A model describing acceleration data of body worn sensors in crawl swimming," 2009 Joint Conference on Pervasive Computing (JCPC), Tamsui, Taiwan, Dec. 3-5, 2009, pp. 293-298.

Turcotte, "Effects of Acceleration on Resultant Joint Moment During Constant and Variable Resistance Training Exercises," Thesis for the degree of Master of Science, The University of Manitoba, Physical Education and Recreation Studies, 2005, 123 pages.

* cited by examiner

DETECTING THE END OF HIKING ACTIVITIES ON A WEARABLE DEVICE

CROSS REFERENCE TO RELATED APPLICATIONS

This application claims the benefit of U.S. Provisional Application Ser. No. 62/907,542 filed Sep. 27, 2019, the entire contents of which is hereby incorporated by reference.

FIELD

The present disclosure relates generally to detecting the end of hiking activities using a wearable device.

BACKGROUND

A wearable device may be worn on the hand, wrist, or arm of a person when hiking. It may be desirable to track hiking activities performed by a user to promote exercise and for other health related reasons. Detecting the end point of a hiking activity is an essential component of accurately tracking hiking activities.

The present is closure is related to other methods of detecting the end of activities on a wearable device. Specifically, U.S. patent application Ser. No. 17/015,912, filed on Sep. 9, 2020, and entitled "DETECTING THE END OF CYCLING ACTIVITIES ON A WEARABLE DEVICE" and U.S. patent application Ser. No. 17/016,020, filed on Sep. 9, 2020 and entitled "DETECTING THE END OF CARDIO MACHINE ACTIVITIES ON A WEARABLE DEVICE", which patent applications are incorporated herein in their entirety.

SUMMARY

In one aspect, described herein are computer implemented methods for improving performance of a wearable device while recording a hiking activity comprising: starting a hiking activity on the wearable device; receiving motion data of a user from a motion sensing module of the wearable device; receiving location data of the user from a GPS module of the wearable device; determining, by one or more processor circuits of the wearable device, a starting location of the hiking activity based on the location data; setting, by the one or more processor circuits, a geo-fence at the starting location; calculating, by one or more processor circuits of the wearable device, the user's performance information during the hiking activity, the performance information including a hiking activity duration and a user location; detecting, by the one or more processor circuits, an end of the hiking activity, the detecting the end of the hiking activity comprising: comparing the hiking activity duration to a hiking duration threshold; in response to detecting a value for the hiking activity duration that exceeds the hiking duration threshold, tracking the user location relative to the geo-fence during the hiking activity; detecting re-entry into the geo-fence by determining the user location is inside the geo-fence; and upon detecting the re-entry, ending the hiking activity session and stopping calculation of the user's performance information; and sending, by the one or more processor circuits, a notification to the user requesting confirmation of the end of the hiking activity.

In one aspect, the hiking activity is started in response to receiving an input from the user. In one aspect, the method comprises: in response to starting the hiking activity, sending a request for permission to track the location data of the user during the hiking activity and receiving consent from the user to have the wearable device track the location data of the user during the hiking activity. In one aspect, location data comprises one or more latitude and longitude fixes generated by triangulating three or more GPS signals.

In one aspect, the method comprises: the determining the starting location of the hiking activity comprising: setting a dwell time for determining the starting location; receiving a plurality of location data measurements during the dwell time; selecting one or more accurate location data measurements having values for one or more error metrics below an error threshold; and computing the starting location based on the one or more accurate location data measurements. In one aspect, the user's performance information includes elevation change.

In one aspect, the method comprises: the calculating the elevation change comprising: receiving pressure data from a pressure sensor of the wearable device; receiving a digital elevation map including topographical information of an area traversed by the user during the hiking activity; and calculating elevation change during the hiking activity based on the pressure data and the digital elevation map. In one aspect, the hiking duration threshold is a tunable parameter that may be set by the wearable device.

In one aspect, the method comprises: the tracking the user location relative to the geo-fence comprising: determining the user's current location during the hiking activity; for each current location of the user determined during the hiking activity, calculating a distance vector measuring a straight-line distance between the user's current location and a center point of the geo-fence; and comparing the distance vector to a geo-fence radius measuring a straight line distance from the center point of the geo-fence to a geo-fence boundary.

In one aspect, the method comprises: confirming the end of the hiking activity based on one or more cues included in sensor data generated by the wearable device. In one aspect, the one or more cues include motion cues, timing cues, activity level cues, and user cues. In one aspect, the geo-fence has circular geo-fence boundaries formed around a center point of the geo-fence, the geo-fence boundaries separated from the center point by a geo-fence radius.

In one aspect, disclosed herein are computer implemented methods for improving performance of a wearable device while recording a hiking activity comprising: starting a hiking activity on the wearable device; receiving motion data of a user from a motion sensing module of the wearable device; receiving location data of the user from a GPS module of the wearable device; determining, by one or more processor circuits of the wearable device, a starting location of the hiking activity based on the location data; setting, by the one or more processor circuits, a geo-fence at the starting location; calculating, by one or more processor circuits of the wearable device, the user's performance information during the hiking activity, the performance information including a hiking activity duration and a user location; tracing, by the one or more processor circuits, a hiking route traveled by a user during the hiking activity, the hiking route determined based on the user location; detecting, by the one or more processor circuits, an end of the hiking activity, the detecting the end of the hiking activity comprising: comparing the hiking activity duration to a hiking duration threshold; in response to detecting a value for the hiking activity duration that exceeds the hiking duration threshold, tracking the user location relative to the geo-fence during the hiking activity; detecting re-entry into the geo-fence by determining the user location is inside the geo-fence; and upon detecting the re-entry, ending the hiking activity session and stopping calculation of the user's performance information; and sending, by the one or more processor circuits, a notification to the user requesting confirmation of the end of the hiking activity.

In one aspect, the method comprises: generating a hiking route trace displaying the hiking route traced by the wearable device over a map of an area traveled through during the hiking activity. In one aspect, the method comprises in response to ending the hiking activity session, displaying the hiking route trace and the performance information on a display screen of the wearable device. In one aspect, location data comprises one or more latitude and longitude fixes generated by triangulating three or more GPS signals.

In one aspect, the method comprises: the determining the starting location of the hiking activity comprising: setting a dwell time for determining the starting location; receiving a plurality of location data measurements during the dwell time; selecting one or more accurate location data measurements having values for one or more error metrics below an error threshold; and computing the starting location based on the one or more accurate location data measurements.

In one aspect, the method comprises: the tracking the user location relative to the geo-fence comprising: determining the user's current location during the hiking activity; for each current location of the user determined during the hiking activity, calculating a distance vector measuring a straight-line distance between the user's current location and a center point of the geo-fence; and comparing the distance vector to a geo-fence radius measuring a straight line distance from the center point of the geo-fence to a geo-fence boundary. In one aspect, the geo-fence has circular geo-fence boundaries formed around a center point of the geo-fence, the geo-fence boundaries separated from the center point by a geo-fence radius.

In one aspect, described herein are systems for improving performance of a wearable device while recording a hiking activity, comprising: a motion sensing module configured to collect a user's motion data; a GPS module configured to collect a user's location data; one or more processor circuits in communication with the motion sensing module and the GPS module and configured to execute instructions causing the processor circuits to: start a hiking activity; determine a starting location of the hiking activity based on the location data; set a geo-fence at the starting location; calculate the user's performance information during the hiking activity, the performance information including a hiking activity duration and a user location; detect an end of the hiking activity, the detecting the end of the hiking activity comprising: comparing the hiking activity duration to a hiking duration threshold; in response to detecting a value for the hiking activity duration that exceeds the hiking duration threshold, tracking the user location relative to the geo-fence during the hiking activity; detecting re-entry into the geo-fence by determining the user location is inside the geo-fence; and upon detecting the re-entry, ending the hiking activity session and stopping calculation of the user's performance information; and send a notification to the user requesting confirmation of the end of the hiking activity.

BRIEF DESCRIPTION OF THE DRAWINGS

Various objectives, features, and advantages of the disclosed subject matter can be more fully appreciated with reference to the following detailed description of the disclosed subject matter when considered in connection with the following drawings, in which like reference numerals identify like elements.

DESCRIPTION

The present disclosure describes systems and methods of detecting the end of hiking activities using a wearable device. Hiking activities are a particular type of walking activity that occurs outdoors over varying terrain. Unlike many walking activities, hiking activities typically start and end at the same location, for example, a trail head, parking lot, and the like. Therefore, it may be possible to use location data received from a wearable device to determine the end of a hiking activity.

Systems and methods of determining the end of a hiking activity are described below and as shown in the figures. However, the disclosure is not limited to the embodiments shown in the figures and described below since not every variation of using location data to determine the end of a hiking activity may be described in detail.

Figure 1:
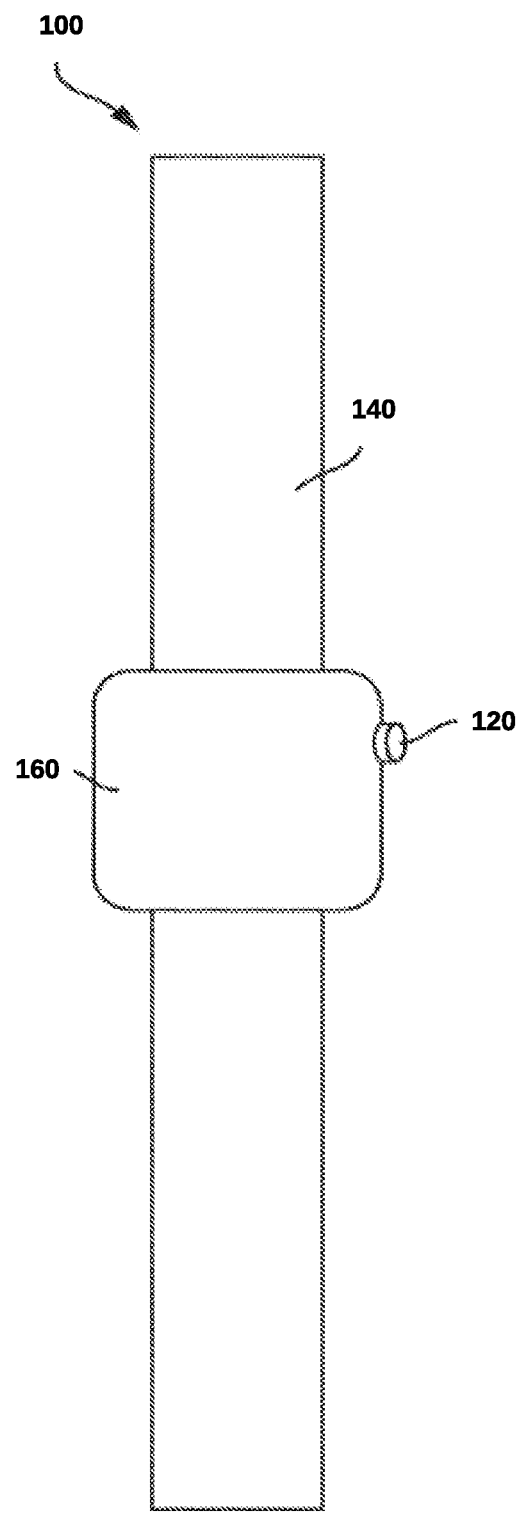
FIG. 1 is a diagram of an exemplary wearable device, according to embodiments of the disclosure.

FIG. 1 shows an example of a wearable device 100 that may be worn by a hiker (or "user"), in accordance with an embodiment of the present disclosure. In some embodiments, the wearable device 100 may be configured to be worn around the user's wrist using a strap 140 (e.g., a watch strap). The wearable device 100 may include one or more mechanisms for entering user inputs. For example, a crown 120 or other button configured to receive user inputs used to operate the wearable device 100. The wearable device 100 may include a display screen 160 for displaying information to a user.

As described in more detail below, the wearable device 100 may be configured to detect the user's hiking activity, calculate performance information of the user while hiking, and provide additional hiking-related functionality to the user. In particular, the wearable device 100 may use location data obtained from a GPS module to detect when a user has ended a hiking activity. The wearable device 100 may also use the location data, motion data received from one or more motion sensors, heart rate data obtained from a heart rate sensing module, and/or pressure data obtained from a pressure sensor to calculate hiking performance information, generate one or more traces mapping a user's hike, and/or perform other hiking related functions.

Figure 2:
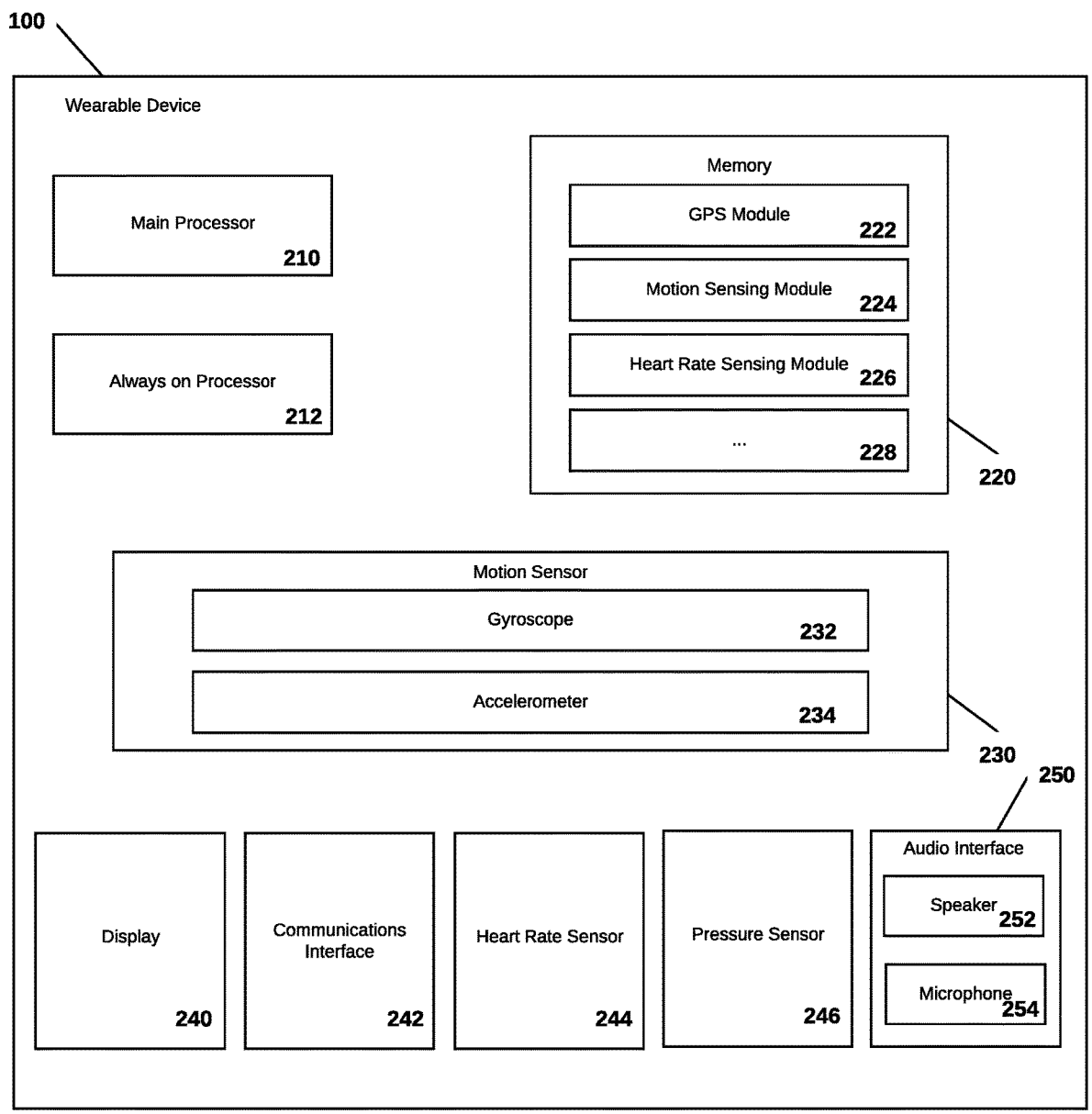
FIG. 2 is a block diagram showing exemplary components that may be found within a wearable device, according to embodiments of the disclosure.

FIG. 2 depicts a block diagram of exemplary components that may be found within the wearable device 100 according to some embodiments of the present disclosure. In some embodiments, the wearable device 100 can include a main processor 210 (or "application processor" or "AP"), an always on processor 212 (or "AOP" or "motion co-processor"), a memory 220, one or more motion sensors 230, a display 240, an interface 242, a heart rate sensor 244, and a pressure sensor 246. The wearable device 100 may include additional modules, fewer modules, or any other suitable combination of modules that perform any suitable operation or combination of operations.

In some embodiments, main processor 210 can include one or more cores and can accommodate one or more threads to run various applications and modules. Software can run on main processor 210 capable of executing computer instructions or computer code. The main processor 210 can also be implemented in hardware using an application specific integrated circuit (ASIC), programmable logic array (PLA), field programmable gate array (FPGA), or any other integrated circuit.

In some embodiments, wearable device 100 can also include an always on processor 212 which may draw less power than the main processor 210. Whereas the main processor 210 may be configured for general purpose computations and communications, the always on processor 212 may be configured to perform a relatively limited set of tasks, such as receiving and processing data from motion sensor 230, heart rate sensor 244, pressure sensor 246, and other modules within the wearable device 100.

Memory 220 can be a non-transitory computer readable medium, flash memory, a magnetic disk drive, an optical drive, a programmable read-only memory (PROM), a read-only memory (ROM), or any other memory or combination of memories. Memory 220 can include one or more modules 222-228.

The main processor 210 and/or always on processor 212 can be configured to run one or more modules 222-228 stored in memory 220 that are configured to cause main processor 210 or always on processor 212 to perform various steps that are discussed throughout the present disclosure.

In some embodiments, the wearable device 100 can include one or more motion sensors 230. For example, motion sensors 230 can include a gyroscope 232 and an accelerometer 234. In some embodiments, accelerometer 234 may be a three-axis accelerometer that measures linear acceleration in up to three-dimensions (for example, x-axis, y-axis, and z-axis). In some embodiments, gyroscope 232 may be a three-axis gyroscope that measures rotational data, such as rotational movement, angular velocity, and or angular acceleration in up to three-dimensions (for example, yaw, pitch, and roll). In some embodiments, accelerometer 234 may be a microelectromechanical system (MEMS) accelerometer, and gyroscope 232 may be a MEMS gyroscope. Main processor 210 or always on processor 212 of wearable device 100 may receive motion data from one or more motion sensors 230 and determine rotational data (i.e., angular velocity and or angular acceleration) based on the motion data. Main processor 210 or always on processor 212 may use the motion data and or rotational data to track acceleration, rotation, position, and or orientation of wearable device 100 in six degrees of freedom through three-dimensional space.

In some embodiments, the wearable device 100 may include other types of sensors in addition to accelerometer 234 and gyroscope 232. For example, the wearable device 100 may include a pressure sensor 246 (e.g., an altimeter or barometer) and/or a location sensor (e.g., a Global Positioning System (GPS) sensor).

The wearable device 100 may also include a display 240. The display 240 may be a screen, such as a crystalline (e.g., sapphire) or glass touchscreen, configured to provide output to the user as well as receive input from the user via touch. For example, the display 240 may be configured to display a current heart rate or daily average energy expenditure. The display 240 may receive input from the user to select, for example, which information should be displayed, or whether the user is beginning a physical activity (e.g., starting a workout activity session) or ending a physical activity (e.g., ending a hiking activity, a running activity, cycling activity, and the like). In some embodiments, wearable device 100 may present output to the user in other ways, such as by producing sound with a speaker 252. Wearable device 100 may also receive input from the user in other ways, such as by receiving voice commands via a microphone 254.

In various embodiments, wearable device 100 may communicate with external devices via an interface 242, including a configuration to present output to a user or receive input from a user. The interface 242 may be a wireless interface. The wireless interface may be a standard Bluetooth® (IEEE 802.15) interface, such as Bluetooth® v4.0, also known as "Bluetooth low energy." In various embodiments, the interface may operate according to a cellphone network protocol such as Long Term Evolution (LTE™) or a Wi-Fi (IEEE 802.11) protocol. In various embodiments, the interface 242 may include wired interfaces, such as a headphone jack or bus connector (e.g., Lightning®, Thunderbolt™, USB, etc.).

Wearable device 100 can measure an individual's current heart rate and other heart rate data from a heart rate sensor 244. The heart rate sensor 244 may also be configured to determine a confidence level indicating a relative likelihood of an accuracy of a given heart rate measurement. In various embodiments, a traditional heart rate monitor may be used and may communicate with wearable device 100 through a near field communication method (e.g., Bluetooth).

In various embodiments, the wearable device 100 can include a photoplethysmogram (PPG) sensor. PPG is a technique for measuring a person's heart rate by optically measuring changes in the person's blood flow at a specific location. PPG can be implemented in many different types of devices in various forms and shapes. For example, a PPG sensor can be implemented in a wearable device 100 in the form of a wrist strap, which a user can wear around the wrist. The PPG sensor can optically measure the blood flow at the wrist. Based on the blood flow information, the wrist strap or another connected device can derive the person's heart rate.

The Wearable device 100 may be configured to communicate with a companion device, such as a smartphone. In various embodiments, wearable device 100 may be configured to communicate with other external devices, such as a notebook or desktop computer, tablet, headphones, Bluetooth headset, etc.

The modules described above are examples, and embodiments of wearable device 100 may include other modules not shown. For example, some embodiments of wearable device 100 may include a rechargeable battery (e.g., a lithium-ion battery), a microphone array, one or more cameras, two or more speakers, a watchband, water-resistant casing or coating, etc. In some embodiments, all modules within wearable device 100 can be electrically and/or mechanically coupled together. In some embodiments, main processor 210 and or always on processor 212 can coordinate the communication among each module.

In various embodiments, the wearable device 100 may use sensed and collected motion data to predict a user's activity. Examples of activities may include, but are not limited to, hiking, walking, running, cycling, swimming, skiing, etc. Wearable device 100 may also be able to predict or otherwise detect when a user is sedentary (e.g., sleeping, sitting, standing still, driving or otherwise controlling a vehicle, etc.). Wearable device 100 may use a variety of motion data to predict a user's activity.

Wearable device 100 may use a variety of heuristics, algorithms, or other techniques to predict the user's activity. Wearable device 100 may also estimate a confidence level (e.g., percentage likelihood, degree of accuracy, etc.) associated with a particular prediction (e.g., 90% likelihood that the user is hiking) or predictions (e.g., 60% likelihood that the user is hiking and 40% likelihood that the user is performing some other activity).

Figure 3:
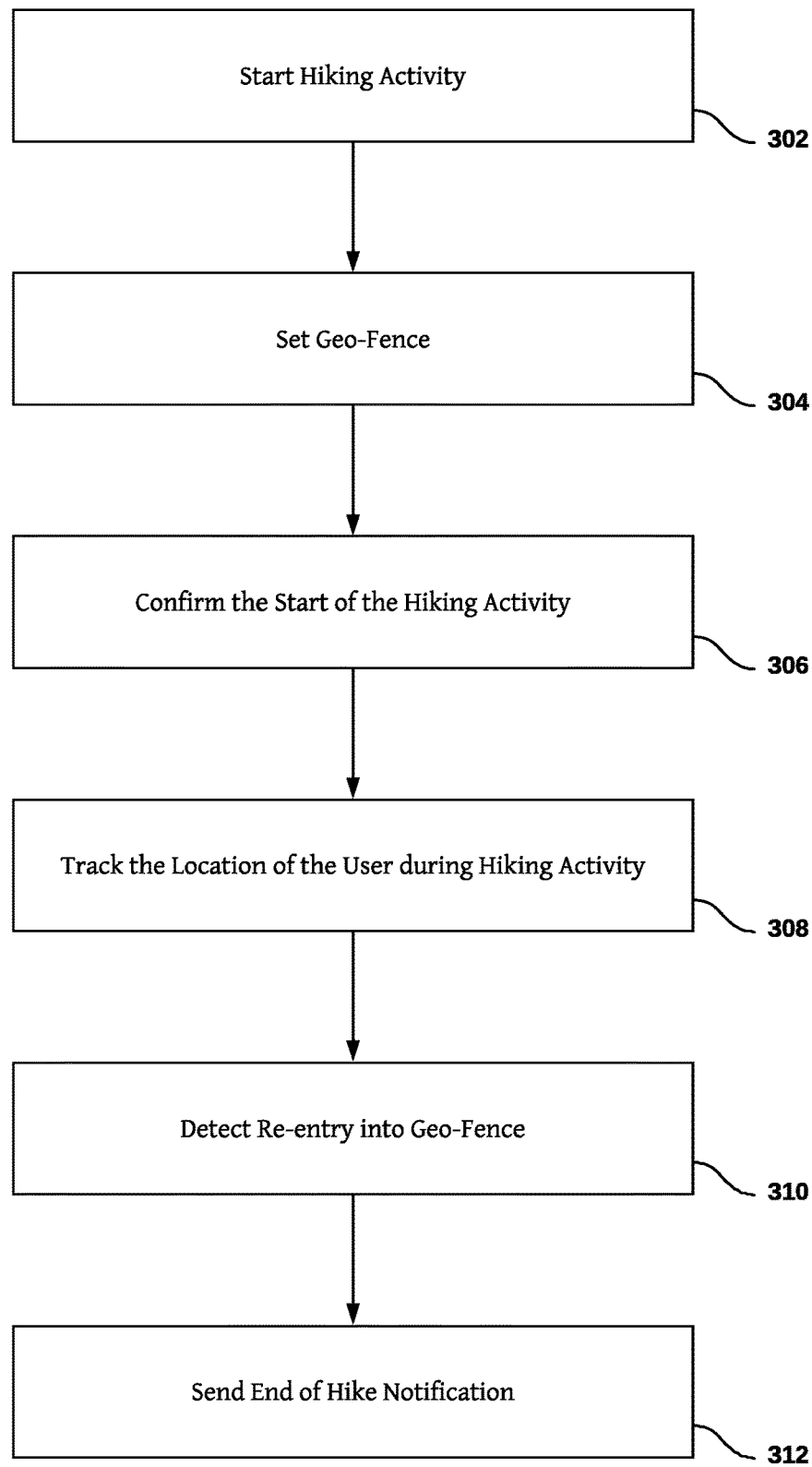
FIG. 3 is a flow chart illustrating a method for detecting the end of a hiking activity, according to embodiments of the disclosure.
Figure 6:
FIG. 6 is an exemplary user interface (UI) for starting a hiking activity, according to embodiments of the disclosure.

FIG. 3 shows an exemplary method for determining the end of a hiking activity. At 302, a user starts a hiking activity. In various embodiments, the user may begin a hiking activity by selecting a hiking activity on a user interface (UI) displayed on a wearable device. An exemplary UI for selecting a hiking activity is shown in FIG. 6. In various embodiments, the wearable device may start a hiking activity automatically by, for example, detecting a user is walking and/or hiking based on one or more of motion data, heart rate data, location data, pressure data, and the like.

At 304, the wearable device sets a geo-fence at a starting location for a hiking activity. In various embodiments, the starting location for a hiking activity may correspond to the location of the user at the time the user selects a hiking activity on the wearable device. The starting location may also correspond to the location of the user at the time the wearable device automatically determines the user has started a hiking activity. For most hiking activities, the user will start and end the hike at the same location (e.g., a trail head, parking lot, and the like), therefore, by setting a geo-fence at a starting location of the hike and tracking the location of the user relative to the geo-fence during the hike, the end of the hike may be detected when the user re-enters the geo-fence. In various embodiments, the geo-fence boundaries are set as a circle around the user's starting location.

The size of the geo-fence may be a tunable parameter of the wearable device and may depend on the GPS sensor and/or other hardware of the wearable device. The size of the geo-fence may be determined by surveying a plurality of datasets including hiking activities having a known starting location, a known ending location, a known hiking activity duration, and or a known hiking activity distance. A preferred range of geo-fence diameters may be determined based on the plurality of datasets by selecting the minimum geo-fence diameter required to accurately determine the ending location, hiking activity duration, and hiking activity distance for the majority of hiking activities included in the plurality of datasets. For example, a preferred range of geo-fence diameters may be between 100 m-0.5 mi. The resolution of the location data generated by the wearable device may also impact the range of geo-fence diameters. The resolution of the location data generated by the wearable device may depend on the GPS sensor and/or other hardware of the wearable device and may be a tunable parameter of the wearable device. For example, the diameter of geo-fences generated by wearable devices having GPS modules with lower location data resolution may be larger than the diameter of geo-fences generated by wearable devices having GPS modules with higher location data resolution. In various embodiments, the wearable device may detect a user's location with an accuracy of plus or minus 60 meters (m). Therefore, the wearable device may be able to accurately determine the user's location relative to the geo-fence center at a resolution of 60 m.

To minimize the variation and/or uncertainty of the geofence position, the wearable device may determine the starting location of a user based on a user dwell time. Poor GPS signal strength, caused by, for example, interference by trees, clouds, tunnels, and the like; suboptimal location relative to one or more satellites used for triangulation of a GPS signal; poor calibration of the GPS sensor; and/or errors in the functioning of the GPS sensor may increase the uncertainty, variation, and/or other error metrics associated with location data (e.g., latitude and longitude fixes) measured by the GPS sensor. To ensure the location of the geo-fence is based on an accurate starting location, location data for a user device may be measured during a dwell time of 30 seconds. One or more statistical operations may then be performed to select the location data measured during the dwell time that has the lowest associated error. In various embodiments, the dwell time may be a tunable parameter, for example, 30 seconds, and location measurements may be taken every second. Using the 30 latitude and longitude fixes and/or other location data measurements captured during the dwell time, the location measurement associated with the lowest values for one or more of uncertainty, variation, and/or other error metrics may be selected as the user starting location and the center of the geo-fence. Location data captured during the dwell time may also be combined to improve accuracy of the user's starting location. In various embodiments, the user starting location may be the average of all location measurements taken during the dwell time and/or the average of a subset of location measurements, for example, location measurements associated with an uncertainty value or other error metric that is below an error threshold.

At 306, the wearable device confirms the user has started the hiking activity. Even after selecting a hiking activity, a user may wait to begin a hiking activity and/or perform one or more activities to prepare for the hike (e.g., change clothes, put on hiking shoes, preview a portion of the hiking trail, read a trail map, use the restroom, eat, drink, and the like). To make sure the user has begun hiking, the wearable device may confirm the start of a hiking activity using one or more types of sensor data. In various embodiments, the wearable device may begin tracking the location of a user (i.e., determining the location of the user at multiple points during the hiking activity) upon the expiration of a minimum time period after a user selects a hiking activity. The minimum amount of time may be set to a duration threshold and the wearable device may begin tracking the location of the user relative to the geo-fence after the time of the hiking activity exceeds the duration threshold. The duration threshold may be a tunable parameter of the wearable device. In various embodiments, it is preferable to have a duration threshold between 3 min-10 min. A preferred duration threshold may be 5 minutes. The period of time selected for the duration threshold may be determined by surveying a plurality of datasets including hiking activities having a known hiking activity start time and a known time when the user actually begins walking. The duration threshold may be tuned to be specific to a particular user by including only hiking activities performed by the particular user and or a group of users having one or more characteristics (e.g., age, fitness level, hiking experience, and the like) in common with the particular user in the plurality of datasets used to determine the duration threshold.

The start of a hiking activity may also be confirmed using one or more of motion data, for example, acceleration data, gyroscope measurements, and or rotational data indicative of walking motion. The features of motion data and or rotational data that are indicative of walking motion may be determined based on surveying a plurality of datasets including motion data and or rotational data generated during known hiking activities. The start of a hiking activity may also be confirmed using heart rate data. For example, the start of a hiking activity may be confirmed based on detecting a user heart rate that indicates the user's current heart rate, work rate, and/or energy expenditure exceeds a resting heart rate, work rate, and/or energy expenditure threshold. The resting heart rate threshold, work rate threshold, and or energy expenditure threshold used to confirm the start of a hiking activity may be determined by surveying a plurality of datasets including heart rate data generated before, during, and or after known hiking activities. The resting heart rate threshold, work rate threshold, and or energy expenditure threshold may be tuned to be specific to a particular user by including only heart rate data collected during hiking activities performed by the particular user and or a group of users having one or more characteristics in common with the user in the plurality of datasets used to determine the heart rate thresholds. Pressure data, for example, atmospheric pressure data indicating a change in elevation that exceeds and elevation threshold may also be used to confirm the start of a hiking activity. The elevation threshold may be determined by surveying a plurality of datasets including pressure data generated during known hiking activities. For example, the elevation threshold may be determined based on the average amount of pressure difference and or elevation gained during a period of time at the start of the hiking activities (e.g., the first 30 seconds of the hiking activity) included in the plurality of datasets. One or more types of sensor data and/or thresholds used to confirm a user is hiking may be specific to hiking activities and/or characteristics of the user (e.g., age, weight, gender, fitness level, and the like).

At 308, the wearable device tracks the location of the user during the hiking activity. To track the user's location, the wearable device may determine a current location of the user from location data and update the user's location as the user moves during the hike. In various embodiments, the user's location is determined using latitude and longitude fixes generated by the GPS module. The wearable device may update the user's location at regular intervals during the hiking activity, for example, the user's location may be updated once every second during the hiking activity. The wearable device may then track the user's current location relative to the geo-fence location to determine if the user is still hiking or if the user has completed the hiking activity. In various embodiments, the wearable device may determine the user's current location relative to the geo-fence location by calculating a distance vector that measures the straight-line distance between the user's current location and the center of the geo-fence. The distance vector may describe a straight-line distance between the latitude and longitude fix at the user's current location and the latitude and longitude fix at the center of the geo-fence generated at the starting location of the hiking activity.

Figure 4:
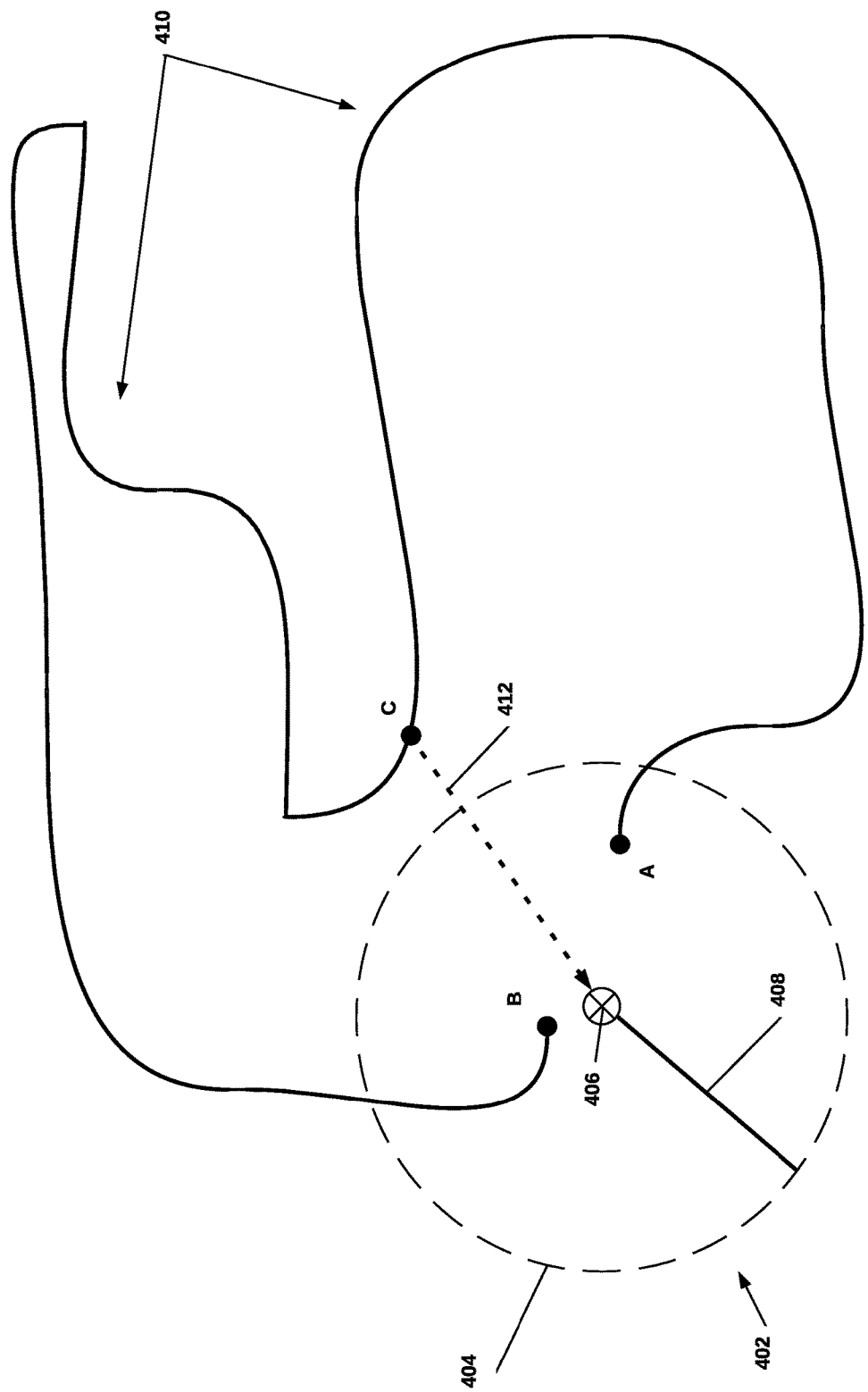
FIG. 4 illustrates an overhead view of an exemplary hiking route, according to embodiments of the disclosure.

At 310, the wearable device determines the end of a hiking activity by detecting re-entry into the geo-fence. In various embodiments, the wearable device may detect re-entry into the geo-fence using the distance vector. To detect re-entry into the geo-fence, the distance vector measured at the user's current location may be compared to the radius of the geo-fence. For example, if the radius of the geo-fence is smaller than the distance vector at the user's current location, the wearable device may determine the user is outside the geo-fence. If the radius of the geo-fence is larger than the distance vector at the user's current location, the wearable device may determine the user is inside the geo-fence. In response to determining the user is inside the geo-fence generated at the starting location of the hiking activity, the wearable device may end the hiking activity and/or stop calculating hiking performance information of the user. The wearable device may also generate a route trace that tracks the hiking route traveled by a user. In various embodiments, hiking performance information may include hike duration, calories burned, steps, hiking pace, change in elevation, total assent, total descent, and the like. FIG. 4 below illustrates an exemplary hiking route trace that may be generated by a wearable device. The hiking route trace may display the hiking route traversed by the user during the hiking activity. To provide additional information about the hiking route, the hiking route trace may display the hiking route overlaid on a map illustrating one or more features (e.g., relative location, terrain type, hiking trails traveled on, and the like) of the area traveled through during the hiking activity. FIG. 4 also illustrates an exemplary the distance vector that may be compared to a geo-fence radius to determine the user's location relative to the geo-fence.

In various embodiments, the wearable device may end the hiking activity after determining the user is inside the geo-fence and confirming the user has ended the hiking activity using one or more cues extracted from sensor data. Preferred cues may include motion features extracted from motion data, for example, accelerometer data, gyroscope data, and or rotational data indicating a user is not performing a walking motion or is performing motion indicative of another activity type (e.g., a swimming activity, a cycling activity, and the like). The end of the hiking activity may also be confirmed using activity level cues extracted from heart rate data. For example, the wearable device may confirm the hiking activity has ended based on detecting a user current heart rate, mechanical work, work rate, and/or energy expenditure inconsistent with heart rate, mechanical work, work rate, and/or energy expenditure measures expected during hiking activities. One or more timing cues may also be used to confirm the end of the hiking activity. For example, the wearable device may confirm the end of the hiking activity by detecting a user current location within a geo-fence boundary for a set duration (e.g., 3 min, 5 min, and the like). User cues, for example, selecting the start of another workout activity type or confirming the end of a hiking activity may also be used to confirm the end of hiking activities.

The motion features, activity level cues, and or timing cues used to confirm the end of hiking activities may be determined by surveying a plurality of datasets including motion data, rotational data, heart rate data, location data, and timing data collected during known hiking activities. The motion features, activity level cues, and or timing cues may be tuned to be specific to a particular user by limiting the hiking activities included in the plurality of datasets to hiking activities performed by the particular user and or a group of users having one or more characteristics in common with the particular user.

At 312, the wearable device notifies the user of the end of the hiking activity. In various embodiments, the wearable device may notify the user by sending a notification that is displayed on the display screen of the wearable device. The notification may include a request to confirm the end of the hiking activity. An exemplary request to confirm the end of the hiking activity may be included in a notification UI displayed on the wearable device. The notification UI may include a prompt for the user to confirm the end of a hiking activity and a selectable item for the user to submit a confirmation.

FIG. 4 illustrates an overhead view of a hiking route 410. The hiking route 410 begins at point "A" and ends at point "B". Both points may be inside of a geo-fence 402. As shown in FIG. 4, during the hiking activity, the user begins inside the geo-fence 402 at point "A"; the user then follows the hiking route 410 in a generally counterclockwise direction. The wearable device then determines the user completes the hike when the user re-enters the geo-fence 402 and reaches point "B". Hiking activities typically start and end at the same place, therefore, by determining when the user re-enters the geo-fence 402, the wearable device may detect the end of a hiking activity. The wearable device may determine when the user re-enters the geo-fence 402 using a distance vector as described below.

In various embodiments, the geo-fence 402 may have circular geo-fence boundaries 404 surrounding a center location 406. The geo-fence may also have geo-fence boundaries that are square, rectangular, triangular, or any other defined or irregular shape. The geo-fence boundaries 404 may be set up around the center location 406 at a distance defined by a geo-fence radius 408. The length of the geo-fence radius 408 may be a tunable parameter of the wearable device. For example, the length of the geo-fence radius 408 may be determined based on a particular user, a particular user characteristic (e.g., age, fitness level, number of previous hiking activities, and the like), a particular location of the hiking activity, and the like. The length of the geo-fence radius 408 may also depend on the specifications of the GPS sensor and other hardware of the wearable device. In various embodiments, the geo-fence radius 408 may be between 10 m-0.5 mi. A preferred geo-fence radius 408 may be 30 m.

As the user traverses the hiking route 410 during the hiking activity, a wearable device may track the location of the user as described above in FIG. 3. The wearable device may determine the relative distance between the user and the geo-fence periodically at any defined time period (e.g., continuously in real time (i.e., fractions of a second), every second, every 10 seconds, every minute, and the like) during the hiking activity. The wearable device may also determine the relative distance between the user and the geo-fence at a plurality of predefined user locations along the hiking route (e.g., at every 0.1 mile along the route, every 0.5 mile along the route, every 100 meters along the route, every 1 km along the route, and the like). The wearable device may then use the relative distance between the user and the geo-fence to determine when the user re-enters the geo-fence. In various embodiments, the wearable device may determine the relative distance between the user the geo-fence based on a distance vector 412. The distance vector 412 may measure the distance between the user's current location and the center location 406 of the geo-fence 402. The wearable device may compute a distance vector 412 by calculating the distance between the latitude and longitude fix at the user's current location along the hiking route 410 and the latitude and longitude fix at the center location 406 of the geo-fence 402. For example, as shown in FIG. 4, the wearable device may calculate the distance vector 412 that measures the distance between the user's current location at point "C" and the center location 406 of the geo-fence 402.

When the distance value of the distance vector 412 is less than the geo-fence radius 408, the wearable device may determine the user is inside the geo-fence 402. When the distance value of the distance vector 412 is greater than the geo-fence radius 408, the wearable device may determine the user is outside the geo-fence 402. Therefore, the wearable device may detect an exit from the geo-fence 402 upon computing a distance vector 412 that exceeds the geo-fence radius 408. The wearable device may detect an entry/re-entry into the geo-fence 402 upon computing a distance vector 412 that is less than the geo-fence radius 408. As shown in FIG. 4, the distance vector 412 may vary in magnitude as the user travels along the hiking route. In various embodiments, the wearable device will maintain the hiking activity as long as the distance vector 412 is greater than the geo-fence radius 408 even if the distance vector 412 becomes closer to the geo-fence radius 408 in the middle of the hiking activity or after a significant period of time has passed since the hiking activity started. Therefore, by using a smaller geo-fence radius 408, the number of false positives for detecting the end of hiking activities can be reduced.

Figure 5:
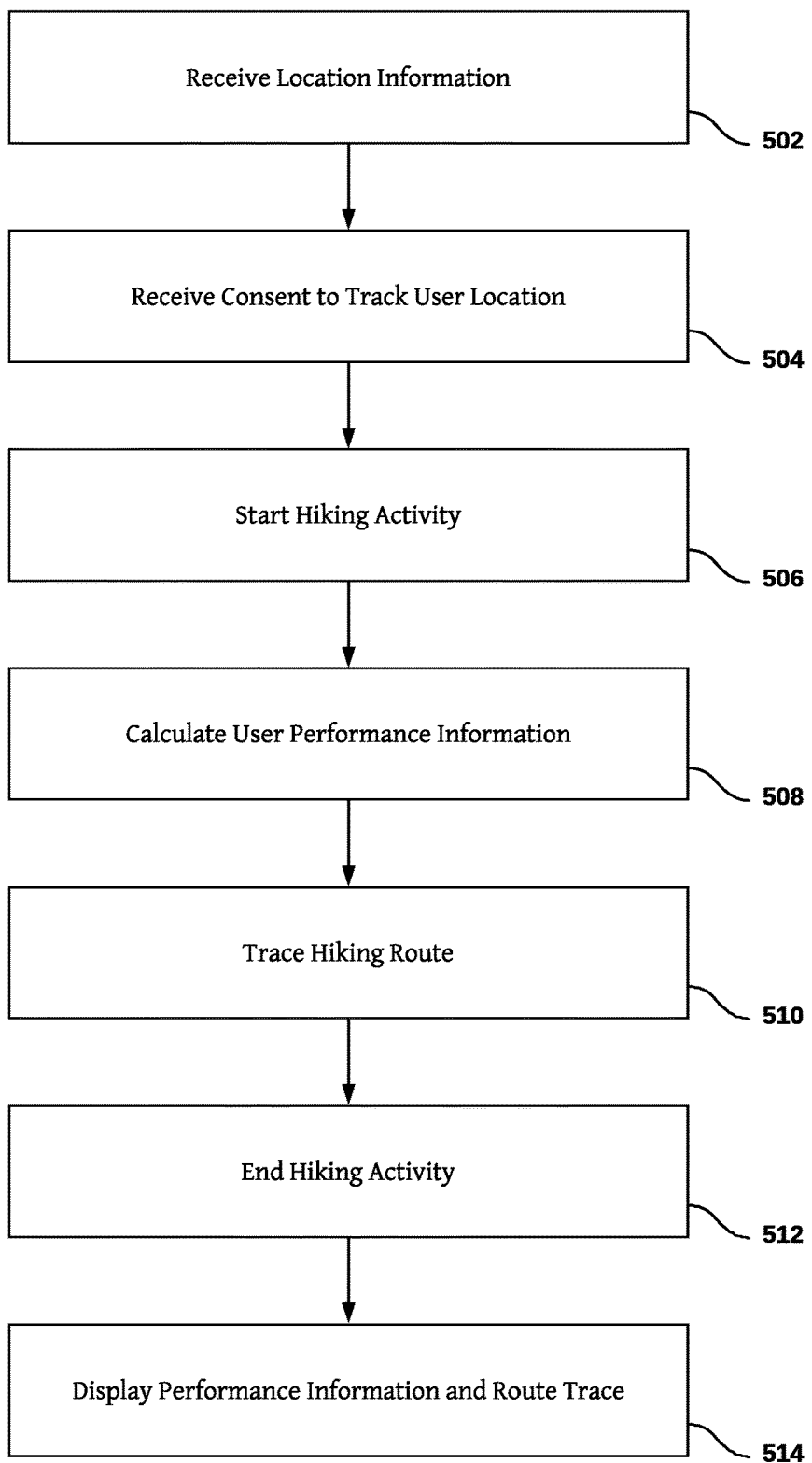
FIG. 5 is a flow chart illustrating methods of tracking a hiking activity on a wearable device, according to embodiments of the disclosure.

FIG. 5 shows an exemplary method for tracking a hiking activity on a wearable device. In various embodiments, the wearable device may trace a hiking route traversed by a user and calculate user performance information during a hiking activity. Performance information may include hike duration, number of calories burned, number of steps, hiking pace, change in elevation, total assent, total descent, and the like. At 502, the wearable device receives location data, for example, latitude and longitude fixes, from a GPS module. The wearable device may request permission from a user to track user location. In various embodiments, the wearable device may request permission to track user location during, for example, initial setup of the wearable device, upon download of one or more applications related to hiking activities, in response to detecting the start of a walking and/or hiking activity, and the like. The request for tracking permission may be a consent notice that complies with one or more privacy policies, terms of use, privacy laws or regulations, and the like. The request for tracking permission may be presented to the user in a UI displayed on the wearable device. In response to receiving a request for permission, a user may give consent. The consent may be received by the wearable device at 504.

At 506, a user starts a hiking activity. At 508, the wearable device calculates performance information of the user during the hiking activity. Performance information may include total ascent, total decent, and other metrics describing elevation change. In various embodiments, the wearable device may determine the elevation change of a user based on one or more of digital elevation maps, pressure data received from a pressure sensor, and/or other sensor data. The wearable device may determine the elevation change during a hiking activity by tracking the location of a user on a digital elevation map that includes topographical information. The digital elevation map may be accessed by the digital elevation map from a third-party server and may have a resolution of about 30 m. The wearable device may also determine elevation change based on pressure data, for example, atmospheric pressure measurements generated by a pressure sensor.

Elevation calculations generated from the digital elevation map require accurate GPS location data and high-resolution topographical data. Accurate GPS location data may be needed to determine the user's location on the digital elevation map and precise topographical data can be required to determine the elevation change along the path traversed by the user. In certain conditions, GPS location data may be unreliable, for example, trees, clouds, tunnels, and other structures may interfere the GPS modules ability to connect with one or more GPS satellites and/or the position of the wearable device relative to one or more GPS satellites may make triangulation difficult (e.g., the satellites may be aligned on the same plane and/or low on the horizon relative to the wearable device). GPS location data generated under these conditions may be associated with a high uncertainty. Additionally, in some areas the digital elevation map may have low resolution. For example, the resolution of the digital elevation maps may be higher in steeper terrain relative to flatter terrain. To improve the accuracy of elevation calculations made by the user device, terrain gradient may be calculated using pressure data. Pressure based elevation measurements may supplement the elevation data generated from the digital elevation maps under difficult conditions (e.g., when the uncertainty of GPS location data is high and/or the user is hiking over flatter terrain). Elevation data generated from digital elevation maps may supplement elevation measurements based on pressure data when pressure data is associated with a high error. For example, when the frequency of pressure measurements is very high, when the pressure data suddenly changes significantly, when water or other substances contacting the wearable device interfere with the pressure sensor, when the calibration of the pressure sensor is disturbed, and the like.

At 510, the wearable device may trace a hiking route traveled by a user during a hiking activity. In various embodiments, the wearable device may trace the hiking route traveled by the user based on location data used to track the location of the user and determine the distance between the user's current location and the geo-fence. After the end of the hiking activity is detected at 512, the route trace and performance information may be displayed to the user on the wearable device at 514. In various embodiments, the route trace may be presented to the user as a hiking route similar to the hiking route shown in FIG. 4 displayed over a map of the area the user traveled through during the hiking activity. The performance information displayed to the user may include the elevation change during the hiking activity that was calculated at 508.

Figure 7:
FIG. 7 is an exemplary UI for ending a hiking activity, according to embodiments of the disclosure.

FIGS. 6-7 illustrate exemplary UIs rendered on a wearable device. FIG. 6 illustrates a UI for starting a hiking activity. The UI may be delivered to the user by the wearable device as a UI rendered on the display screen. As shown in FIG. 6, the start hiking activity GUI may include a hiking icon, a start workout activity prompt, and or a selection queue for selecting a workout activity type. To begin a hiking activity, a user may select a "start hiking activity" option from the selection queue. Once a user makes a selection, the wearable device starts a hiking activity. In various embodiments, selecting a hiking activity from the workout activity selection queue may trigger display of a location tracking request and/or begin the process of setting a geo-fence. A hiking activity may also be started automatically by the wearable device in response to detecting motion data, heart rate data, pressure data, or other data associated with the start of a hiking activity. The wearable device may also display the start hiking activity GUI to the user automatically in response to detecting motion data, heart rate data, pressure data, or other data associated with the start of a hiking activity.

FIG. 7, illustrates a UI for ending a hiking activity. The UI may be delivered to the user by the wearable device as a UI rendered on the display screen. As shown in FIG. 7, the end hiking activity UI may include a hiking icon, an end workout activity prompt, and or a selection queue for confirming the end of a hiking activity and/or changing a workout activity type. In various embodiments, the end hiking activity UI may be displayed on the wearable device in response to detecting a re-entry into the geo-fence. To confirm the end of a hiking activity, a user may select the end hiking activity option from the selection queue. In response to receiving the confirmation of the end of the hiking activity from the user, the wearable device may stop calculating user hiking performance information and tracing the user's route. The wearable device may then display the performance information and route trace for the hiking activity on the display screen.

Figure 8:
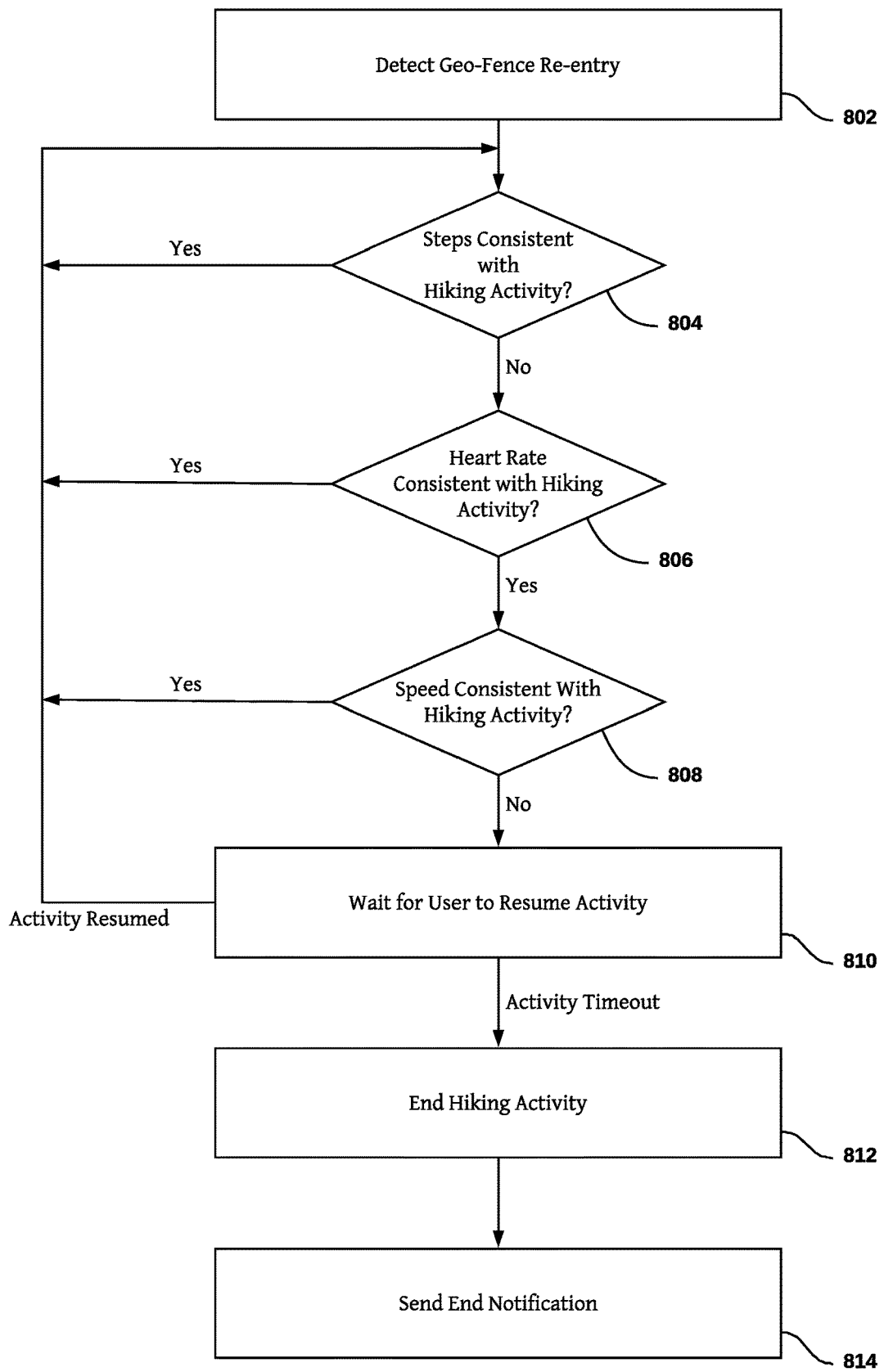
FIG. 8 is a flow chart illustrating methods of confirming the end of a hiking activity, according to embodiments of the disclosure.

FIG. 8 illustrates an exemplary method for confirming the end of a hiking activity. At 802, a wearable device detects a geo-fence re-entry as described above in FIG. 3. In response to detecting the geo-fence re-entry, user performance information including steps, heart rate, and speed may be calculated and/or evaluated by the wearable device. At steps 804-808, the wearable device compares user performance information to one or more aspects of a hiking activity profile. The hiking activity profile may be determined by surveying a large volume of datasets including motion data, rotational data, heart rate data, and or hiking speed data collected during known hiking activities. The plurality of datasets used to determine the hiking activity profile may also include performance information calculated during the known hiking activities. In various embodiments, the hiking activity profiles may be specific to a particular user. To generate a user specific hiking activity profile, the hiking activities and or performance information included in the plurality of datasets used to generate the profile may be limited to hiking activities performed by the particular user and or a group of users having one or more characteristics (e.g., weight, BMI, age, gender, fitness level, and the like) in common with the particular user.

At step 804, steps are calculated using motion data, for example, accelerometer data and or rotational data, measured during the hiking activity. The steps may be calculated for the entire hiking activity and or a predetermined portion of the hiking activity (e.g., 30 seconds, 5 minutes, or any other time period). The steps calculated from motion data are then compared to expected steps for a hiking activity over the same time period that is included in the hiking activity profile. The expected steps may be determined by surveying a plurality of datasets including motion data and or calculated steps collected during known hiking activities. The wearable device may determine expected steps for a particular user by limiting the hiking activities included in the plurality of datasets to hiking activities performed by the particular user and or a group of users having one or more characteristics in common with the particular user. If the calculated steps are consistent with the expected steps included in the hiking activity profile (e.g., the calculated steps are within a threshold percent difference of the expected steps), the hiking activity may be maintained. If the steps are inconsistent with the expected steps included in the hiking activity profile (i.e., the calculated steps are not within a threshold percent difference of the expected steps), additional analysis may be performed to confirm the end of the hiking activity. For example, the wearable device may perform analysis on the heart rate data at step 806 and or hiking speed data at step 808 to confirm the end of the hiking activity.

The threshold percent difference between calculated steps and expected steps for a hiking activity may be determined by surveying a plurality of datasets including motion data and or calculated steps collected during known hiking activities performed by one or more users and hiking activity profiles including the expected steps for hiking activities for the same one or more users. The threshold percent difference of the calculated and expected steps may be specific to a particular user by limiting the hiking activities and hiking activity profiles included in the plurality of datasets to hiking activities performed by and hiking activity profiles associated with the particular user and or a group of users having one or more characteristics in common with the particular user.

At step 806, user heart rate is calculated from heart rate data generated by a heart rate sensor. The user heart rate may be calculated for the entire hiking activity and or a predetermined portion of the hiking activity. The calculated user heart rate is then compared to an expected heart rate for a hiking activity included in the hiking activity profile. The expected heart rate may be determined by surveying a plurality of datasets including heart rate data collected during known hiking activities. The wearable device may determine an expected heart rate during a hiking activity for a particular user by limiting the hiking activities included in the plurality of datasets to hiking activities performed by the particular user and or a group of users having one or more characteristics in common with the particular user. If the calculated user heart rate is consistent with the expected heart rate (e.g., the calculated user heart rate is within a threshold percent difference of the expected heart rate), the hiking activity may be maintained. If the heart rate is inconsistent with the expected heart rate included in the hiking activity profile, additional analysis may be performed to confirm the end of the hiking activity. For example, the wearable device may perform analysis on hiking speed data at step 808 to confirm the end of the hiking activity.

The threshold percent difference between the calculated user heart rate and the expected user heart rate for a hiking activity may be determined by surveying a plurality of datasets including heart rate data collected during known hiking activities performed by one or more users and hiking activity profiles including the expected heart rates for hiking activities for the same one or more users. The threshold percent difference for the calculated and expected heart rates may be specific to a particular user by limiting the hiking activities and hiking activity profiles included in the plurality of datasets to hiking activities performed by and hiking activity profiles associated with the particular user and or a group of users having one or more characteristics in common with the particular user.

At step 808, user hiking speed is calculated using location data generated by a GPS module. For example, user hiking speed may be determined based on the amount of time required for the user to travel from a first location measured by the GPS module to a second location measured by the GPS. The user hiking speed may be calculated for the entire hiking activity and or a predetermined period of time and or distance (e.g., a distance of 500 m, 500 ft, 0.5 mi, and the like and or a time of 10 seconds, 1 minute, 15 minutes, and the like). The user hiking speed is then compared to an expected hiking speed included in the hiking activity profile. The expected hiking speed may be determined by surveying a plurality of datasets including speed data collected during known hiking activities. The wearable device may determine an expected hiking speed for a particular user by limiting the hiking activities included in the plurality of datasets to hiking activities performed by the particular user and or a group of users having one or more characteristics in common with the particular user. If the speed is consistent with the expected speed (e.g., within a threshold percent difference of the expected speed), the hiking activity may be maintained. If the speed is inconsistent with the expected speed included in the hiking activity profile, the wearable device may wait for an activity timeout at step 610.

The threshold percent difference between calculated hiking speed and the expected hiking speed may be determined by surveying a plurality of datasets including hiking speed data collected during known hiking activities performed by one or more users and hiking activity profiles including the expected hiking speed for hiking activities for the same one or more users. The threshold percent difference of the calculated and expected hiking speed may be specific to a particular user by limiting the hiking activities and hiking activity profiles included in the plurality of datasets to hiking activities performed by—and hiking activity profiles associated with—the particular user and or a group of users having one or more characteristics in common with the particular user.

If an activity timeout is detected, the wearable device may end the hiking activity at step 812. If the user resumes hiking before an activity timeout, the hiking activity may be maintained and steps 804-810 may be repeated until the end of a hiking activity is detected. At step 814, in response to detecting the end of a hiking activity, the wearable device may send an end notification to the user. In various embodiments, the end notification may be a UI displayed on a display screen of the wearable device. The UI may include a selectable option for confirming the end of the hiking activity. An exemplary end notification UI is shown above in FIG. 7.

The foregoing description is intended to convey a thorough understanding of the embodiments described by providing a number of specific exemplary embodiments and details involving activity detection, workout performance tracking, hiking activity monitoring, and route tracing. It should be appreciated, however, that the present disclosure is not limited to these specific embodiments and details, which are examples only. It is further understood that one possessing ordinary skill in the art, in light of known systems and methods, would appreciate the use of the invention for its intended purposes and benefits in any number of alternative embodiments, depending on specific design and other needs.

It is to be understood that the disclosed subject matter s not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

As used herein, the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

As used herein, the terms "and/or" and "at least one of" include any and all combinations of one or more of the associated listed items.

Certain details are set forth in the foregoing description and in FIGS. 1-8 to provide a thorough understanding of various embodiments of the present invention. Other details describing well-known structures and systems often associated with wearable devices, hiking activities, activity end detection, workout performance tracking, hiking activity monitoring, route tracing for hiking, and the like, however, are not set forth below to avoid unnecessarily obscuring the description of the various embodiments of the present invention.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A method for improving performance of a wearable device while recording a hiking activity, the method comprising:
   starting a hiking activity on the wearable device;
   measuring, by a motion sensing module of the wearable device, motion data of a user;
   measuring, by a GPS module of the wearable device, location data of the user;
   determining, by a processor circuit of the wearable device, a starting location of the hiking activity based on the location data;
   generating, by the processor circuit, a geo-fence around the starting location, such that the starting location is inside of the geo-fence;
   calculating, by the processor circuit, performance information of the user during the hiking activity;
   determining, by the processor circuit, a location of the user at multiple points during the hiking activity based on the location data; and
   detecting, by the processor circuit, an end of the hiking activity based on a re-entry into the geo-fence, wherein
   in response to starting the hiking activity,
      sending, by the processor circuit, a request for permission to track the location data of the user during the hiking activity; and
      receiving consent from the user to have the wearable device track the location data of the user during the hiking activity.

2. The method of claim 1, wherein the detecting the end of the hiking activity includes:
   in response to starting the hiking activity, determining a hiking activity duration;
   comparing the hiking activity duration to a hiking duration threshold;
   in response to detecting a value for the hiking activity duration that exceeds the hiking duration threshold, continuously tracking a user location relative to the geo-fence during the hiking activity; and
   detecting re-entry into the geo-fence in response to determining the user location is inside a boundary of the geo-fence.

3. The method of claim 2, comprising:
   in response to detecting the re-entry, ending, by the processor circuit, the hiking activity and stopping calculation of the performance information of the user; and
   sending, by processor circuit, a notification to the user requesting confirmation of the end of the hiking activity.

4. The method of claim 2, wherein the continuously tracking the user location relative to the geo-fence includes:
   determining a current location of the user at a time point during the hiking activity;
   generating a distance vector that measures a straight-line distance between the current location of the user and a center point of the geo-fence; and
   comparing the distance vector to a geo-fence radius measuring a straight line distance from the center point of the geo-fence to the geo-fence boundary.

5. The method of claim 1, wherein the location data comprises one or more latitude and longitude fixes generated by triangulating three or more GPS signals.

6. The method of claim 1, wherein the determining the starting location of the hiking activity includes:
   setting a dwell time for determining the starting location;
   receiving a plurality of location data measurements during the dwell time;
   selecting one or more accurate location data measurements having a value for one or more error metrics below an error threshold; and
   determining the starting location based on the one or more accurate location data measurements.

7. The method of claim 1, wherein the performance information of the user includes an elevation change and at least one of a number of calories burned, a number of steps, a hiking time, and a hiking distance.

8. The method of claim 7, wherein the calculating the elevation change includes:
   measuring, by a pressure sensor of the wearable device, pressure data during the hiking activity;
   accessing, by the processor circuit, a digital elevation map including topographical data of an area traversed by the user during the hiking activity; and
   calculating, by the processor circuit, the elevation change during the hiking activity based on the pressure data and the digital elevation map.

9. The method of claim 1, comprising:
   confirming the end of the hiking activity based on one or more cues included in sensor data measured by the wearable device.

10. The method of claim 9, wherein the one or more cues include motion features, timing cues, activity level cues, and user cues.

11. The method of claim 1, wherein the geo-fence has circular geo-fence boundaries formed around a center point of the geo-fence, the geo-fence boundaries separated from the center point by a geo-fence radius.

12. The method of claim 1, comprising:
   generating, by the processor circuit, a hiking route trace displaying the hiking route traversed during the hiking activity overlaid on a map illustrating an area traveled through during the hiking activity.

13. The method of claim 12 comprising:
in response to ending the hiking activity, displaying, by the processor circuit, the hiking route trace and the performance information on a display screen of the wearable device.

14. A system for improving performance of a wearable device while recording a hiking activity, the system comprising:
a motion sensing module configured to measure motion data of a user;
a GPS module configured to measure location data of the user; and
a processor circuit in communication with the motion sensing module and the GPS module and configured to execute instructions causing the processor circuit to:
start the hiking activity;
determine a starting location of the hiking activity based on the location data;
generate a geo-fence around the starting location such that the starting location is inside of the geo-fence;
calculate performance information of the user during the hiking activity;
determine a location of the user at multiple points during the hiking activity based on the location data; and
detect an end of the hiking activity based on a re-entry into the geo-fence, wherein in response to starting the hiking activity,
sending a request for permission to track the location data of the user during the hiking activity; and
receiving consent from the user to have the wearable device track the location data of the user during the hiking activity.

15. The system of claim 14, wherein the processor circuit is further configured to:
in response to starting the hiking activity, determine a hiking activity duration;
compare the hiking activity duration to a hiking duration threshold;
in response to detecting a value for the hiking activity duration that exceeds the hiking duration threshold, continuously track a user location relative to the geo-fence during the hiking activity;
detect re-entry into the geo-fence in response to determining the user location is inside a boundary of the geo-fence; and
detect the end of the hiking activity based on the detected re-entry.

16. The system of claim 15, wherein the processor circuit is further configured to:
end the hiking activity and stop calculation of the performance information of the user in response to detecting the re-entry; and
send a notification to the user requesting confirmation of the end of the hiking activity.

17. The system of claim 14, wherein the processor circuit is further configured to:
set a dwell time for determining the starting location;
receive a plurality of location data measurements during the dwell time;
select one or more accurate location data measurements having a value for one or more error metrics below an error threshold; and
determine the starting location based on the one or more accurate location data measurements.

18. The system of claim 14, wherein the performance information of the user includes an elevation change and at least one of a number of calories burned, a number of steps, a hiking time, and a hiking distance.

19. The system of claim 18, further comprising:
a pressure sensor configured to measure pressure data during the hiking activity,
wherein the processor circuit is further configured to:
access a digital elevation map including topographical data of an area traversed by the user during the hiking activity; and
calculate the elevation change during the hiking activity based on the pressure data and the digital elevation map.

* * * * *